(12) United States Patent
Takubo et al.

(10) Patent No.: US 8,180,244 B2
(45) Date of Patent: May 15, 2012

(54) IMAGE FORMING APPARATUS AND OPERATION ACCEPTING METHOD

(75) Inventors: Masashi Takubo, Tokyo (JP); Kayo Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 12/836,917

(22) Filed: Jul. 15, 2010

(65) Prior Publication Data

US 2011/0020027 A1 Jan. 27, 2011

(30) Foreign Application Priority Data

Jul. 21, 2009 (JP) ................................. 2009-170325

(51) Int. Cl.
*G03G 15/00* (2006.01)
(52) U.S. Cl. .............. 399/81; 399/185; 345/173; 725/52
(58) Field of Classification Search .................... 399/75, 399/81, 126, 185; 345/173; 725/46, 47, 725/52
See application file for complete search history.

(56) References Cited

U.S. PATENT DOCUMENTS

| 5,739,821 | A | * | 4/1998 | Ho et al. | ....................... 715/807 |
| 2004/0088727 | A1 | * | 5/2004 | Kamiya | ......................... 725/52 |

FOREIGN PATENT DOCUMENTS

| JP | 10-171570 | 6/1998 |
| JP | 2003-131773 | 5/2003 |
| JP | 2006-155205 | 6/2006 |

* cited by examiner

*Primary Examiner* — David Porta
*Assistant Examiner* — Benjamin Schmitt
(74) *Attorney, Agent, or Firm* — Oblon, Spivak, McClelland, Maier & Neustadt, L.L.P.

(57) ABSTRACT

A disclosed image forming apparatus accepts a selecting operation of selecting a button displayed on a touch panel and performs a process corresponding to the selected button. The image forming apparatus includes a moving region display unit displaying a region mark to be selected on the touch panel and moving the region mark as time passes and a button specifying unit specifying one or more buttons based on positional information indicating a position of the region mark and positional information indicating a pressed position of the touch panel.

15 Claims, 38 Drawing Sheets

FIG.7

| SCREEN A | BUTTON INFORMATION | FRAME SHAPE INFORMATION | CHARACTER INFORMATION | POSITIONAL INFORMATION (UPPER LEFT CORNER) |
|---|---|---|---|---|
| | MOVING BUTTON 1 | A.bmp | COPY | X1,Y1 |
| | MOVING BUTTON 2 | | DOCUMENTBOX | X2,Y2 |
| | MOVING BUTTON 3 | | SEND | X3,Y3 |

FIG.10

| MOVING BUTTON | NUMBER OF TIMES |
|---|---:|
| MOVING BUTTON 1(COPY) | 123 |
| MOVING BUTTON 2 (DOCUMENTBOX) | 2 |
| MOVING BUTTON 3 (SEND) | 7 |

| NUMBER OF TIMES | SIZE |
|---|---|
| 0-5 | SMALL |
| 6-10 | MEDIUM |
| 11- | LARGE |

FIG.11B

| SCREEN A | BUTTON INFORMATION | FRAME SHAPE INFORMATION | CHARACTER INFORMATION | POSITIONAL INFORMATION (UPPER LEFT CORNER) |
|---|---|---|---|---|
| | MOVING BUTTON 1 | A(SMALL).bmp | COPY (SMALL,MEDIUM,LARGE) | X1,Y1 |
| | MOVING BUTTON 2 | A(MEDIUM).bmp | DOCUMENTBOX (SMALL,MEDIUM,LARGE) | X2,Y2 |
| | MOVING BUTTON 3 | A(LARGE).bmp | SEND (SMALL,MEDIUM,LARGE) | X3,Y3 |

| NUMBER OF TIMES | SPEED |
|---|---|
| 0-5 | FAST |
| 6-10 | MEDIUM |
| 11- | SLOW |

FIG.16A
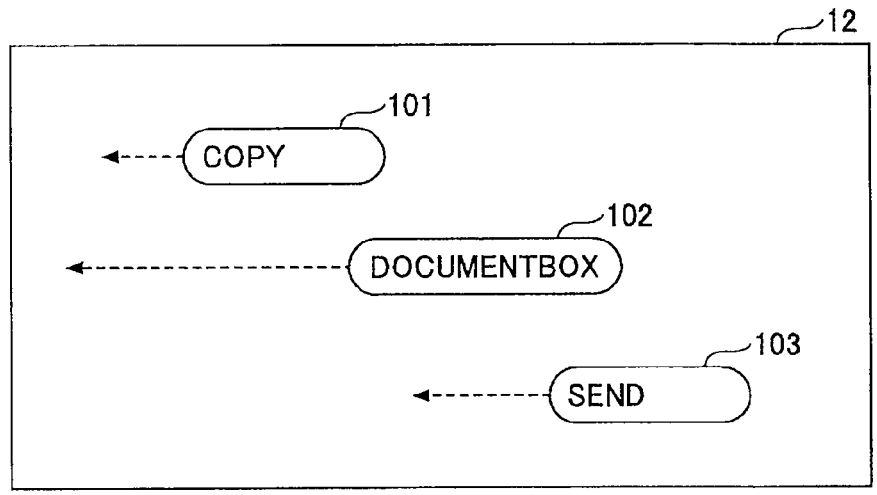
FIG.16B
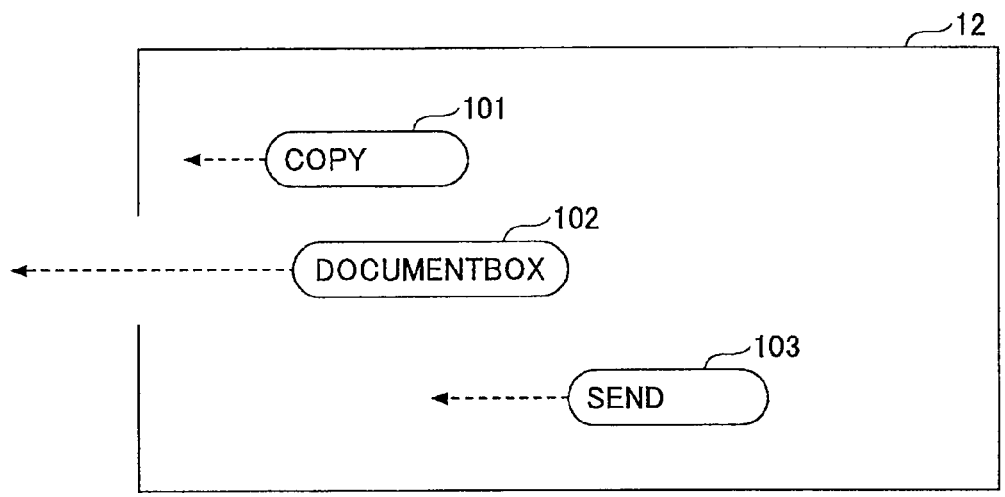
FIG.17
| NUMBER OF TIMES | COLOR |
|---|---|
| 0-5 | GRAY |
| 6-10 | BLACK |
| 11- | RED |

FIG.21

| SCREEN A | BUTTON INFORMATION | FRAME SHAPE INFORMATION | CHARACTER INFORMATION | POSITIONAL INFORMATION (UPPER LEFT CORNER) | NUMBER INFORMATION |
|---|---|---|---|---|---|
| | MOVING BUTTON 1 | A.bmp | COPY | X1,Y1 | 1 |
| | MOVING BUTTON 2 | | DOCUMENTBOX | X2,Y2 | 2 |
| | MOVING BUTTON 3 | | SEND | X3,Y3 | 3 |

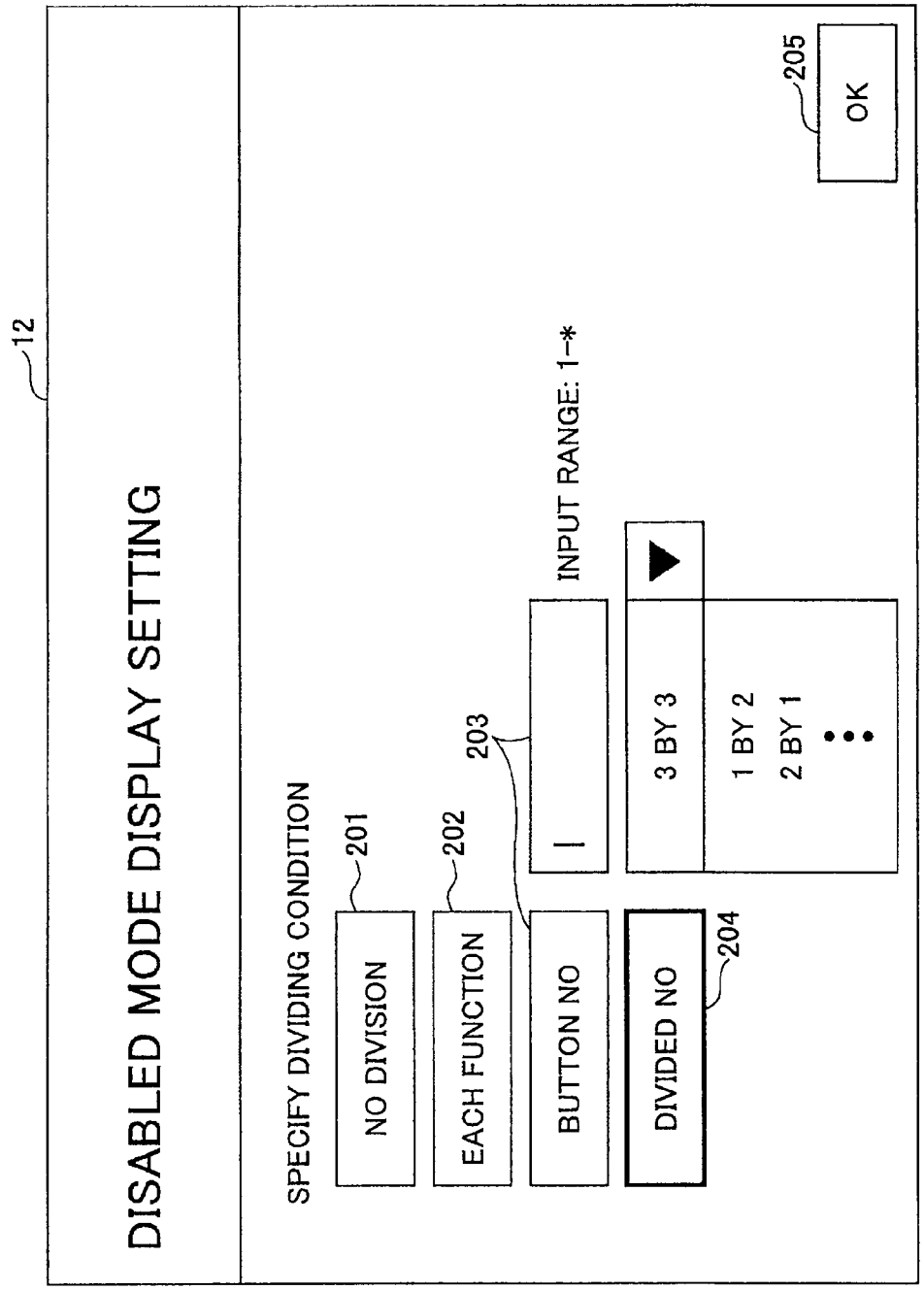

FIG.28A

| DIVISION SETTING INFORMATION | | |
|---|---|---|
| DIVIDING CONDITION | DIVIDED NO | BUTTON NO |
| AREA | 9 | — |

| APPARATUS CONFIGURATION RESTRICTION INFORMATION | | |
|---|---|---|
| DEVICE (FUNCTION) | STATUS | NO DISPLAY ITEM |
| FINISHER | NO MOUNTED | STAPLE/PUNCH |
| ADF | NO MOUNTED | SADF |
| MANUAL TRAY | NO MOUNTED | MANUAL TRAY |

| USER USE RESTRICTION INFORMATION | | | |
|---|---|---|---|
| USER NAME | FUNCTION (DEVICE) | APPLICATION USE RESTRICTION | USE RESTRICTION ITEM |
| A | COPY | USABLE | MONOCHROME |
| | FACSIMILE | USABLE | NO RESTRICTION |
| | SCANNER | NOT USABLE | — |

SCREEN CONFIGURATION INFORMATION 452

| BUTTON ID | SETTING ITEM | FUNCTION NAME | COORDINATES (X,Y) |
|---|---|---|---|
| KEY01 | FULL COLOR | COLOR | (50,100) |
| KEY02 | MONOCHROME | COLOR | (50,150) |
| KEY11 | ORIGINAL TYPE | ORIGINAL TYPE | (50,250) |
| KEY21 | AUTO PAPER SELECT | PAPER | (100,100) |
| KEY22 | A4 | PAPER | (150,100) |
| KEY23 | B4 | PAPER | (200,100) |
| KEY24 | A3 | PAPER | (250,100) |
| ... | ... | ... | ... |

FIG.30

| DIVIDED REGION INFORMATION | | | 453 |
|---|---|---|---|
| DIVIDED REGION ID | COORDINATES (X1,Y1) | COORDINATES (X2,Y2) | |
| PART1 | (0,0) | (100,100) | |
| PART2 | (100,0) | (200,100) | |
| PART3 | (200,0) | (300,100) | |
| PART4 | (0,100) | (100,200) | |
| PART5 | (100,100) | (200,200) | |
| PART6 | (200,100) | (300,200) | |
| PART7 | (0,200) | (100,300) | |
| ... | ... | ... | |

FIG.31

| BUTTON POSITIONING REGION INFORMATION | |
|---|---|
| BUTTON ID | DIVIDED REGION ID |
| KEY01 | PART4 |
| KEY02 | PART4 |
| KEY11 | PART7 |
| KEY21 | PART5 |
| KEY22 | PART5 |
| KEY23 | PART6 |
| KEY24 | PART6 |
| ... | ... |

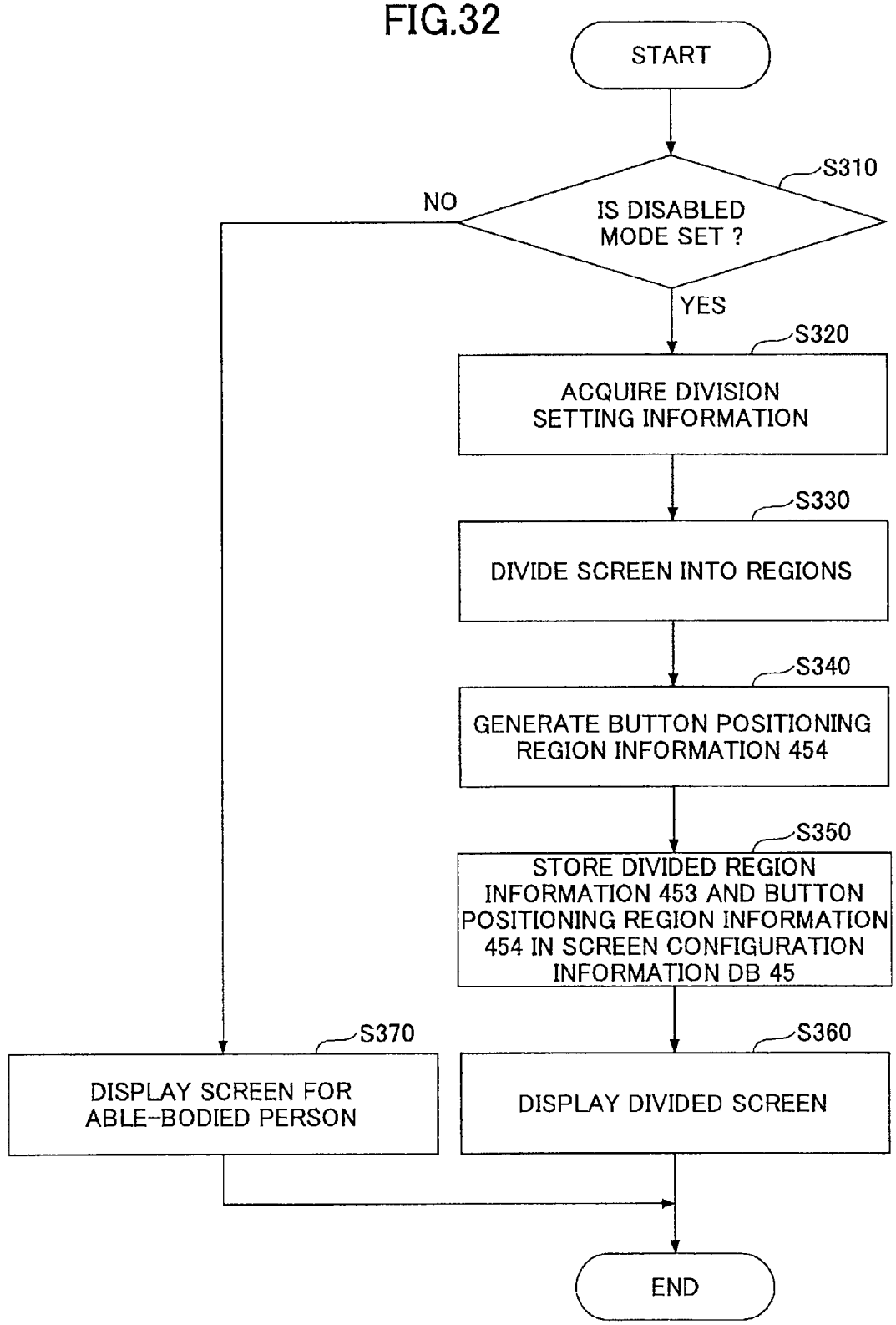

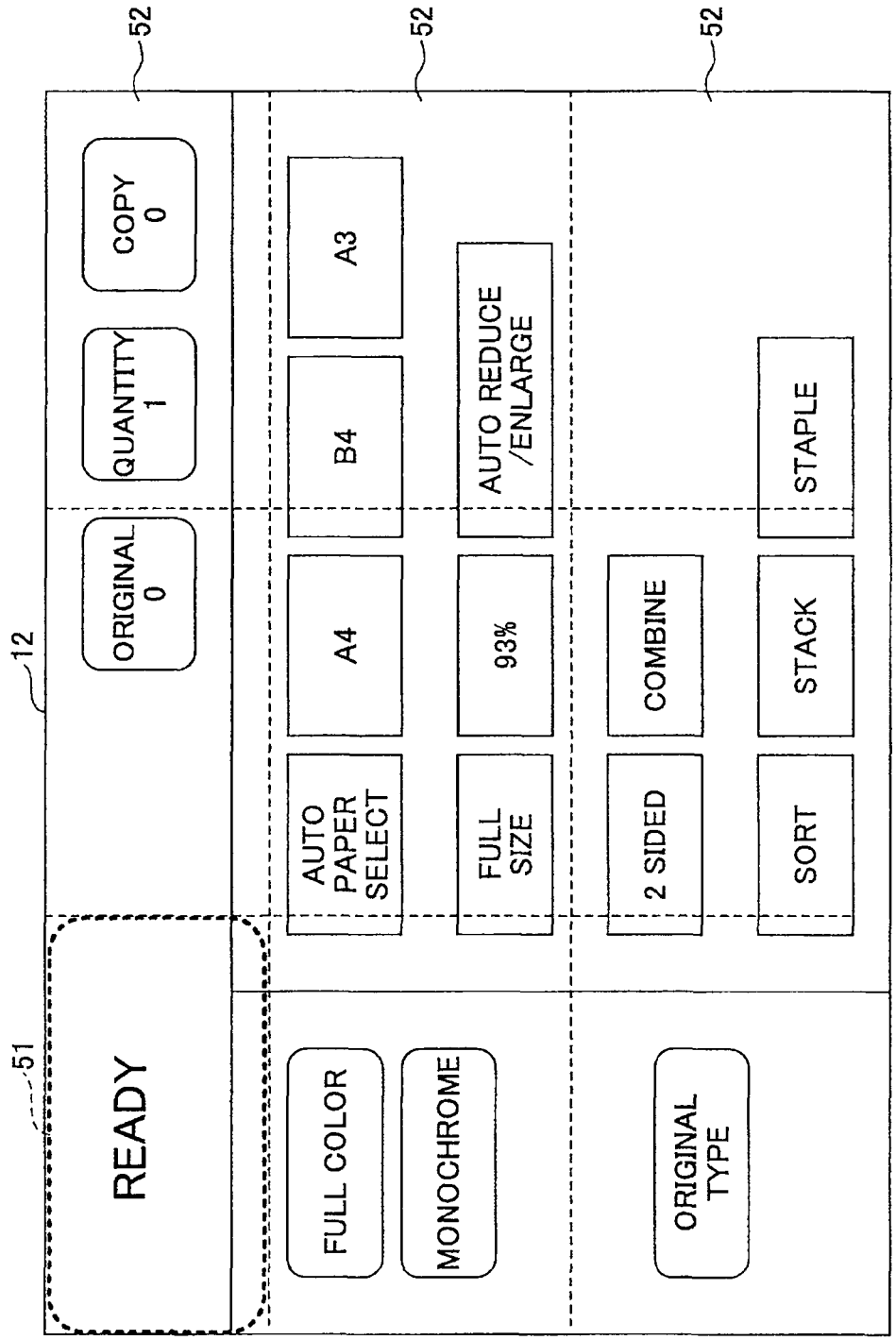

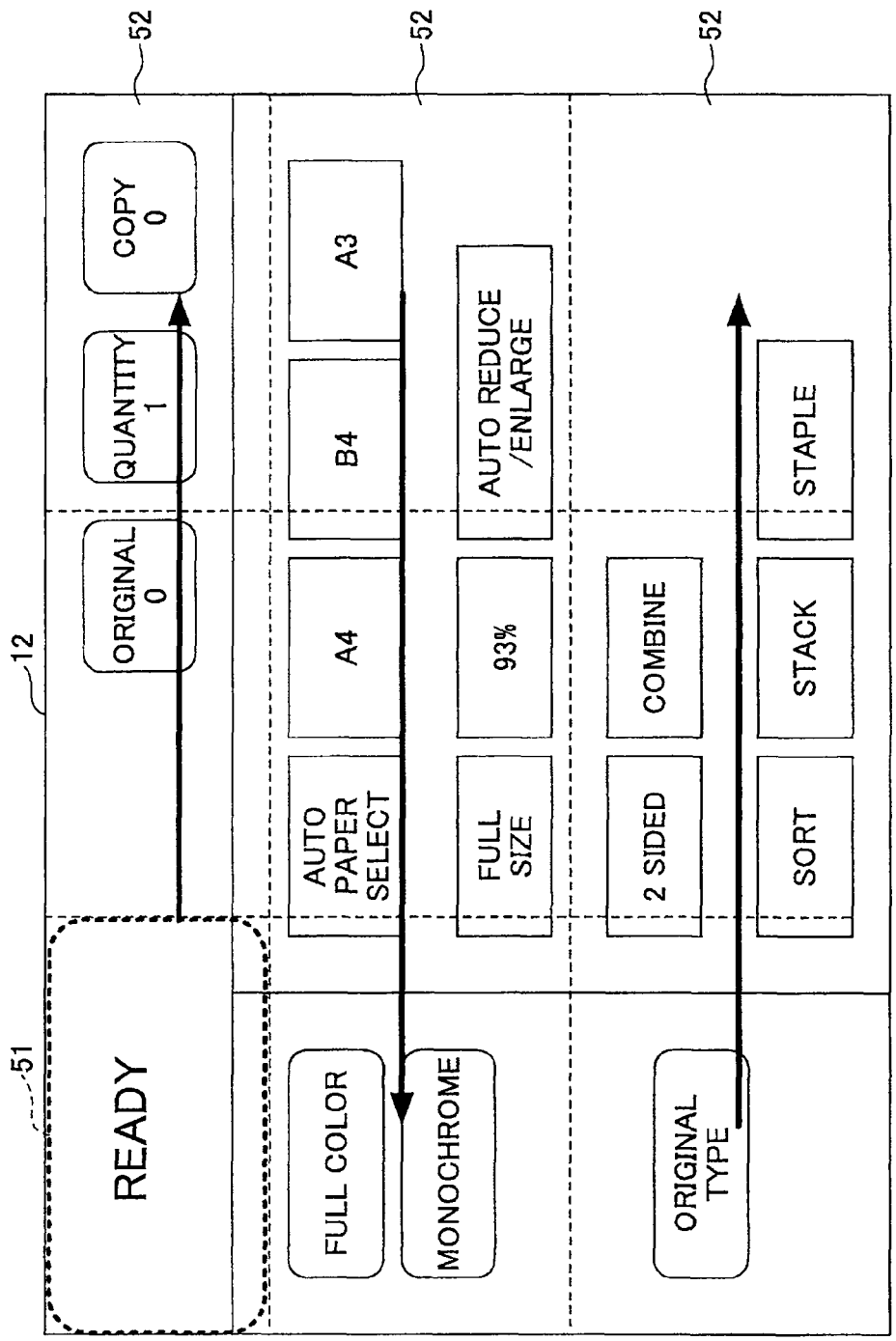

FIG.36

POSITIONED BUTTON INFORMATION 455

| BUTTON ID | COORDINATES (X3,Y3) | COORDINATES (X4,Y4) |
|---|---|---|
| KEY03 | (100,200) | (200,300) |
| KEY04 | (110,220) | (220,320) |
| KEY07 | (120,240) | (240,340) |
| KEY08 | (130,260) | (260,360) |
| KEY11 | (140,280) | (280,380) |
| KEY12 | (150,300) | (300,400) |

FIG.37

| SELECTION FRAME MOVING STATE/ PANEL INPUT | NORMAL PRESS | LONG PRESS | NORMAL PRESS →RELEASE | LONG PRESS →RELEASE |
|---|---|---|---|---|
| STATE 1 AUTO | I STATE 1 | I STATE 1 | III STATE 1 | IV STATE 2 |
| STATE 2 MANUAL | II STATE 2 | I STATE 2 | — STATE 2 | III STATE 2 |

IMAGE FORMING APPARATUS AND OPERATION ACCEPTING METHOD

CROSS-REFERNCE TO RELATED APPLICATIONS

The present application claims priority under 35 U.S. §119 to Japanese Patent Application No. 2009-170325 filed Jul. 21, 2009, the entire contents of which are hereby incorporated herein by reference.

BACKGROUND OF THE INVENTION

1. Field of the Invention

The present invention generally relates to an image forming apparatus accepting a selecting operation of a button displayed on a touch panel and performing a process corresponding to the selected button. More specifically, the present invention relates to an image forming apparatus and an operation accepting method in which various methods of selecting buttons are provided.

2. Description of the Related Art

There are some people who temporarily or permanently suffer from physical disorder. For such people suffering from physical disorder (hereinafter "the disabled"), it may be difficult to move his/her hand (finger) to the various positions on a touch panel of an apparatus to set a desired operating condition of the apparatus.

To overcome the difficulty, various methods have been developed to help the disabled so as to operate apparatuses more easily. Japanese Patent Application Publication No. 10-171570 ("Patent Document 1") discloses a switching input method in which an arrow bar rotates and scans on a display and, when the arrow bar is at the desired position, the disabled uses a pneumatic switch to select (input) the operation displayed at the desired position.

Further, Japanese Patent Application Publication No. 2006-155205 ("Patent Document 2") discloses a technique making it easier to select (press) a button positioned where it is hard to be pressed down, though the technique is not specifically targeted to the disabled. More specifically, Patent Document 2 discloses an input control apparatus in which a display screen is divided into plural display regions, which enables an operator to select one of the plural display regions. In this case, the operator uses a pointing device. More specifically, the operator precisely moves the pointing device in any direction to determine the input position.

However, in the switching input method of Patent Document 1, a means for detecting the pneumatic air pressure is additionally required; and as a result, an operation of the apparatus may not be completed with a touch panel alone.

On the other hand, in the input control apparatus of Patent Document 2, it is still difficult for the disabled to precisely operate (move) the pointing device.

SUMMARY OF THE INVENTION

The present invention may provide an image forming apparatus and an operation accepting method allowing a user to easily operate the apparatus.

According to an aspect of the present invention, there is provided an image forming apparatus accepting a selecting operation of selecting a button displayed on a touch panel thereof and performing a process corresponding to the selected button. The image forming apparatus includes a moving region display unit displaying a region mark to be selected on the touch panel and moving the region mark as time passes, and a button specifying unit specifying one or more buttons based on positional information indicating a position of the region mark and positional information indicating a pressed position of the touch panel.

By having this configuration, it may become possible to provide an image forming apparatus and an operation accepting method allowing a user to easily operate the apparatus via the touch panel alone.

BRIEF DESCRIPTION OF THE DRAWINGS

Other objects, features, and advantages of the present invention will become more apparent from the following description when read in conjunction with the accompanying drawings, in which:

FIG. 7 is drawing showing an example of display data;

FIG. 10 is a drawing schematically showing an example of a count table;

FIG. 11A is a table showing a relationship between the number of pressing buttons and sizes of the buttons;

FIG. 11B is a table showing an example of display data of the buttons;

FIGS. 16A and 16B are drawings showing an example of a screen displayed on the liquid crystal display section;

FIG. 17 is a table showing a relationship between the number of pressing buttons and the colors of the buttons according to a forth example of the first embodiment of the present invention;

FIG. 21 is a table showing an example of the display data of the buttons;

FIG. 27 is a drawing showing an example of a setting screen for setting a screen dividing condition;

FIG. 28A is a table showing an example of division setting information;

FIG. 28B is a table showing an example of apparatus configuration restriction information;

FIG. 28C is a table showing an example of user use restriction information;

FIG. 29 is a table showing an example of screen configuration information stored in a screen configuration information DB;

FIG. 30 is a table showing an example of divided region information indicating the coordinate data (values) of divided regions;

FIG. 31 is a table showing an example of button positioning region information in which button ID is associated with the divided region ID;

FIG. 32 is an exemplary flowchart showing a process starting from when "Divided" is set in a setting screen of dividing conditions until button positioning region information is generated;

FIG. 33 is a drawing showing an example of a screen displayed by a screen control section;

FIG. 34 is a drawing showing an example of button selection using a moving selection frame;

FIG. 36 is a drawing showing an example of repositioned button information generated by a repositioning processing section;

FIG. 37 is an exemplary state transition table showing transitions of state when the screens of the touch panel in FIGS. 33 through 35 are pressed;

DETAILED DESCRIPTION OF THE PREFERRED EMBODIMENTS

Figure 1:
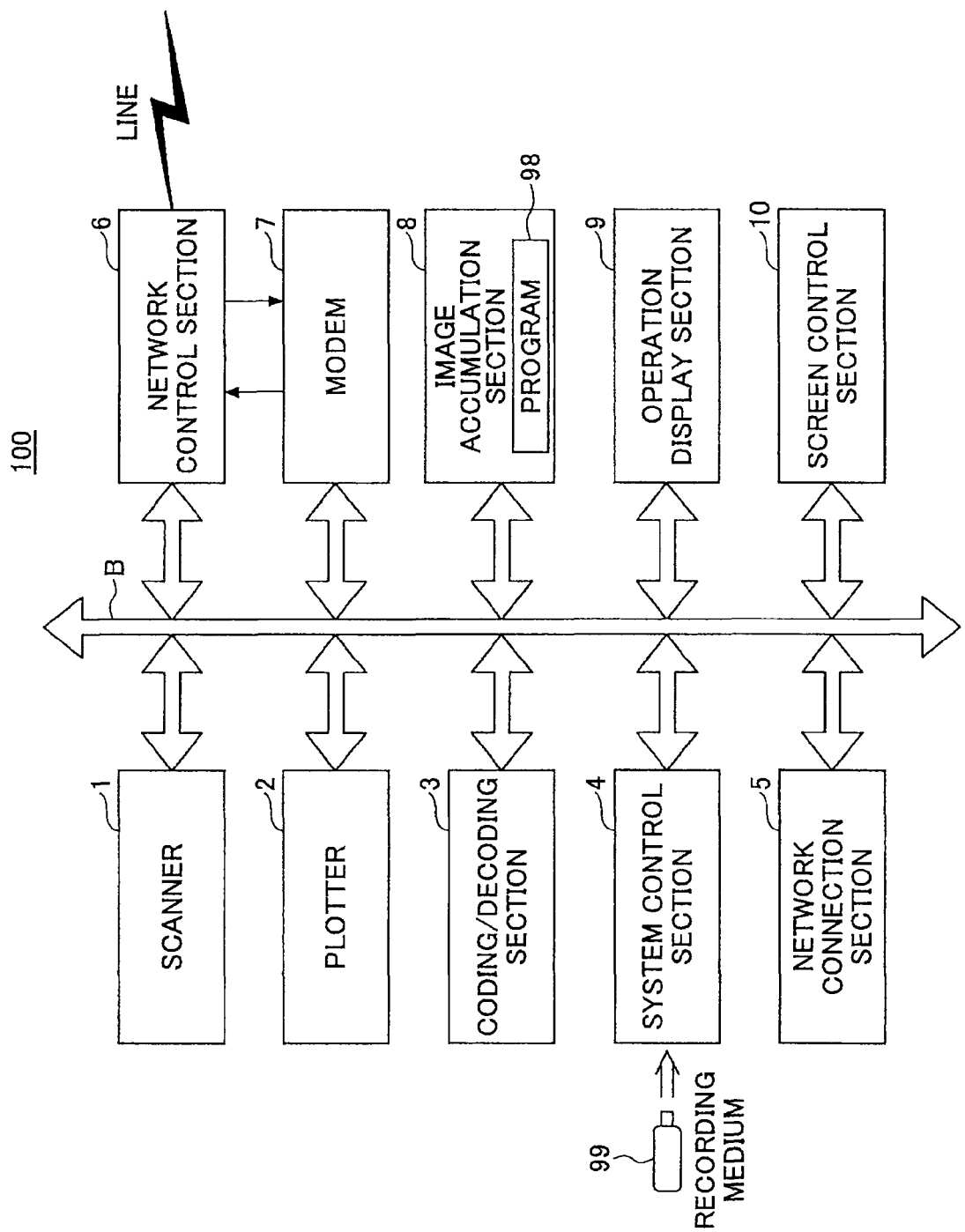
FIG. 1 is a functional block diagram of an image forming apparatus according to a first example of a first embodiment of the present invention.

In the following, preferred embodiments for carrying out the present invention are described using examples with reference to the accompanying drawings.

In an image forming apparatus 100 according to an embodiment of the present invention, a button called a "moving button" which is to be selected is moved and displayed on a touch panel of an operation display section.

More specifically, according to a first embodiment of the present invention, upon detecting that the moving button is pressed (selected), the image forming apparatus 100 accepts the input of operation information (i.e., setting item) displayed on the moving button. Further, plural moving buttons having respective setting items are moved and (sequentially) displayed. Because of this feature, the disabled may select a desired moving button to be selected by waiting until the desired moving button is displayed from among the plural moving buttons sequentially displayed in the operation display section. Then, when the desired moving button is well displayed, the disabled may press the desired moving button easily. By repeating this process, the disabled may easily set the desired setting conditions for operating the image forming apparatus 100.

Next, according to a second embodiment of the present invention, a selection frame is provided and is moved through the regions of the operation display section. By having this configuration, the disabled may press "any" part of the surface of the operation display section when the moving selection frame is positioned on the region where the desired setting item is displayed. By pressing in this way, the image forming apparatus 100 accepts the setting items as input candidates, the setting items being displayed in the region where the selection frame is positioned. Then, the image forming apparatus 100 redisplays (repositions) the setting items accepted as the input candidates in a manner such that the disabled may select the setting item more easily. Because of this feature, it may become possible for the disabled to set a desired setting condition for operating the image forming apparatus 100 by touching any part of the surface of the operation display section when the moving selection frame is at the region where the desired setting item is displayed.

In the following, explanations are made assuming that the operator is disabled. However, an able-bodied person may also use the following operating methods provided for the apparatus according to an embodiment of the present invention. When it is not necessary to distinguish between the disabled and the able-bodied persons, the term "user" may be herein used.

Further, in the descriptions of the embodiments of the present invention, the image forming apparatus 100 is representatively described. However, obviously, the present invention is not limited to this configuration described below. The operation accepting method according to an embodiment of the present invention may also be preferably applied to, for example, information processing apparatuses using a touch panel (e.g., a cellular phone, PDA (Personal Data Assistance), PHS, and Personal Computer).

First Embodiment

FIRST EXAMPLE

FIG. 1 shows an exemplary block diagram of the image forming apparatus 100. As shown in FIG. 1, the image forming apparatus 100 includes a scanner 1, a plotter 2, a coding/decoding section 3, a system control section 4, a network connection section 5, a network control section 6, a modem 7, an image accumulation section 8, an operation display section 9, and a screen control section 10. Those sections are connected to each other via a system bus B.

The scanner 1 includes a line sensor having CCD (Charge Coupled Device) photoelectric conversion elements, A/D converters, and driving circuits. The scanner 1 optically scans an original document placed on a contact glass. Then, the scanner 1 generates RGB (or CMYK) 8-bit digital image data based on gray-level information of the original document obtained by the scanning.

Upon receiving RGB (or CMYK) digital image data, the plotter 2 outputs the received image data onto a transfer paper through an electrophotographic process using a laser beam.

The coding/decoding section 3 encodes document (paper) information to be transmitted from the network control section 6 to compress the data using a known coding method such as the MH (Modified Hoffman) coding method.

Further, the coding/decoding section 3 decodes the document (paper) information received via the network control section 6 so as to reproduce the original document (paper) information.

The system control section 4 is a microcomputer controlling the entire image forming apparatus 100. The system control section 4 includes a CPU (Central Processing Unit), a RAM (Random Access Memory), a ROM (Read Only Memory), an HDD (Hard Disk Drive), an input/output interface, an ASIC (Application Specific Integrated Circuit) and the like.

The network connection section 5 is a NIC (Network Interface Card) to connect to a network such as a LAN (Local Area Network), and enables the network connection between the physical layer and the data link layer. By having this feature, it becomes possible for a router or application software to perform its protocol process of, for example, an upper TCP/IP layer.

The network control section 6 is a communication device to connect to a telephone line, and performs line control to transmit data to and receive data from switching equipment.

The modem 7 modulates the document (paper) information to and demodulates the document (paper) information from the network control section 6, and transmits various procedure signals to control the transmissions.

The image accumulation section 8 is a large-capacity storage device such as a hard disk to store electronic data. The image accumulation section 8 stores digital image data, information attached to the digital image data, and font data.

Further, according to this embodiment, the image accumulation section 8 stores a program 98 for controlling the screen display. This program 98 is stored in a recording medium 99 to be distributed. When the recording medium 99 is connected to a recording medium interface with the system control section 4, the program 98 is installed in the image accumulation section 8. Further, the program 98 may be installed in the image accumulation section 8 from a server (not shown) via the network connection section 5.

The operation display section 9 provides a (special) user interface when the disabled operates the image forming apparatus 100. The operation display section 9 includes an LCD (Liquid Crystal Display), a touch panel, hardware key switches (hereinafter "hard key(s)"), ten keys and the like. The operation display section 9 causes the LCD to display various statuses and operation menus (methods) of the image forming apparatus 100 and detects the operations as the disabled (operator) presses the touch panel, the hard keys, and the ten keys. The operation display section 9 is connected to the system control section 4; therefore, the system control section 4 can control the image forming apparatus 100 based on a result of the operation performed on the operation display section 9.

The screen control section 10 controls the display of the operation display section 9 to display and move a moving button. The details of the screen control section 10 are described below.

User Interface for Able-Bodied Person

Figure 2:
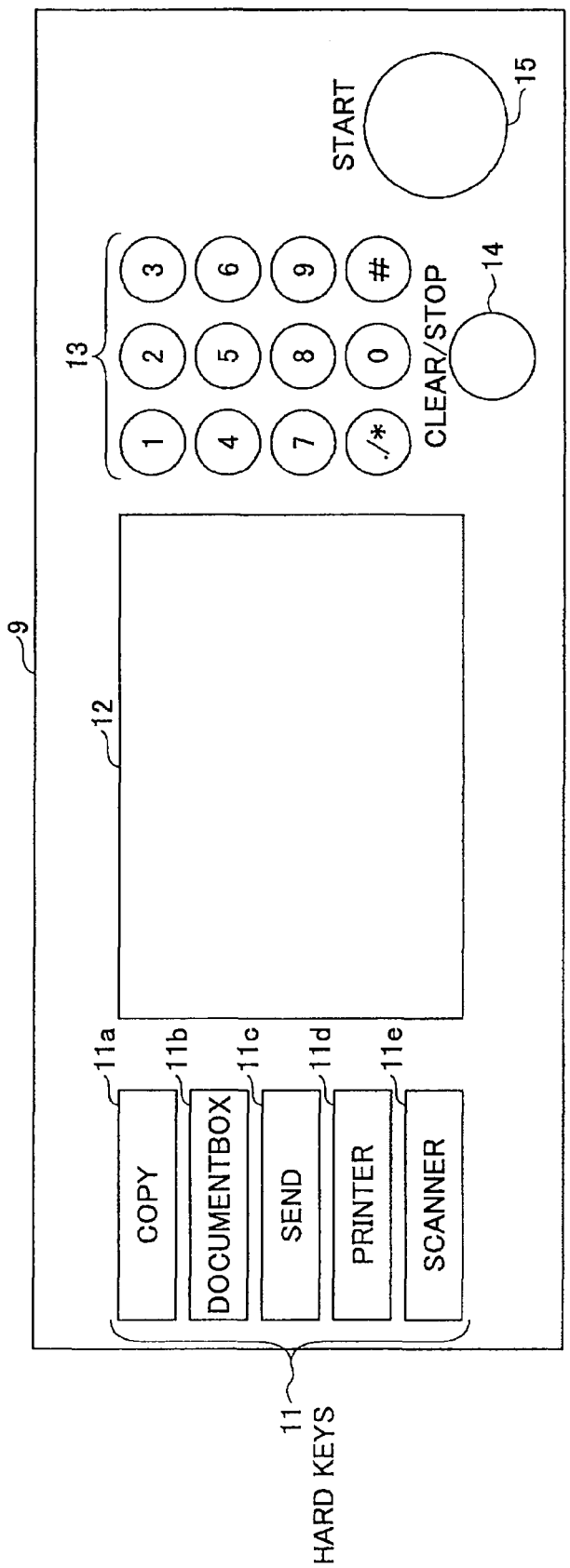
FIG. 2 is a drawing showing an exemplary configuration of an operation display section of the image forming apparatus.

FIG. 2 shows an exemplary configuration of the operation display section 9 of the image forming apparatus 100. As shown in FIG. 2, the operation display section 9 includes hard keys 11, a liquid crystal display section 12, ten keys 13, a "Clear/Stop" key 14, and a "Start" key 15. The liquid crystal display section 12 displays various buttons to provide respective functions, characters guiding the operation method, symbols, icons, messages and the like.

The hard keys 11 includes a "Copy" key 11a, a "DocumentBox" key 11b, a "SEND" key 11c, a "PRINTER" key 11d, and a "Scanner" key 11e. For example, when a user presses the "Copy" key 11a, the liquid crystal display section 12 displays a screen for copy functions. When a user presses the "DocumentBox" key 11b, the liquid crystal display section 12 displays a screen for DocumentBox functions. When a user presses the "SEND" key 11c, the liquid crystal display section 12 displays a screen for facsimile functions or E-mail functions. When a user presses the "PRINTER" key 11d, the liquid crystal display section 12 displays a screen for printer functions. When a user presses the "Scanner" key 11e, the liquid crystal display section 12 displays a screen for scanner functions.

The ten keys 13 are used, for example, to set the number of copies from the original paper (document). The "Start" key 15 is used to cause the image forming apparatus 100 to start functions such as copying, storing document data, facsimile transmission (E-mail transmission), printing, scanning and the like. The "Clear/Stop" key 14 is used, for example, to temporarily stop the printing operation of the image forming apparatus 100 upon being pressed during the printing.

Figure 3:
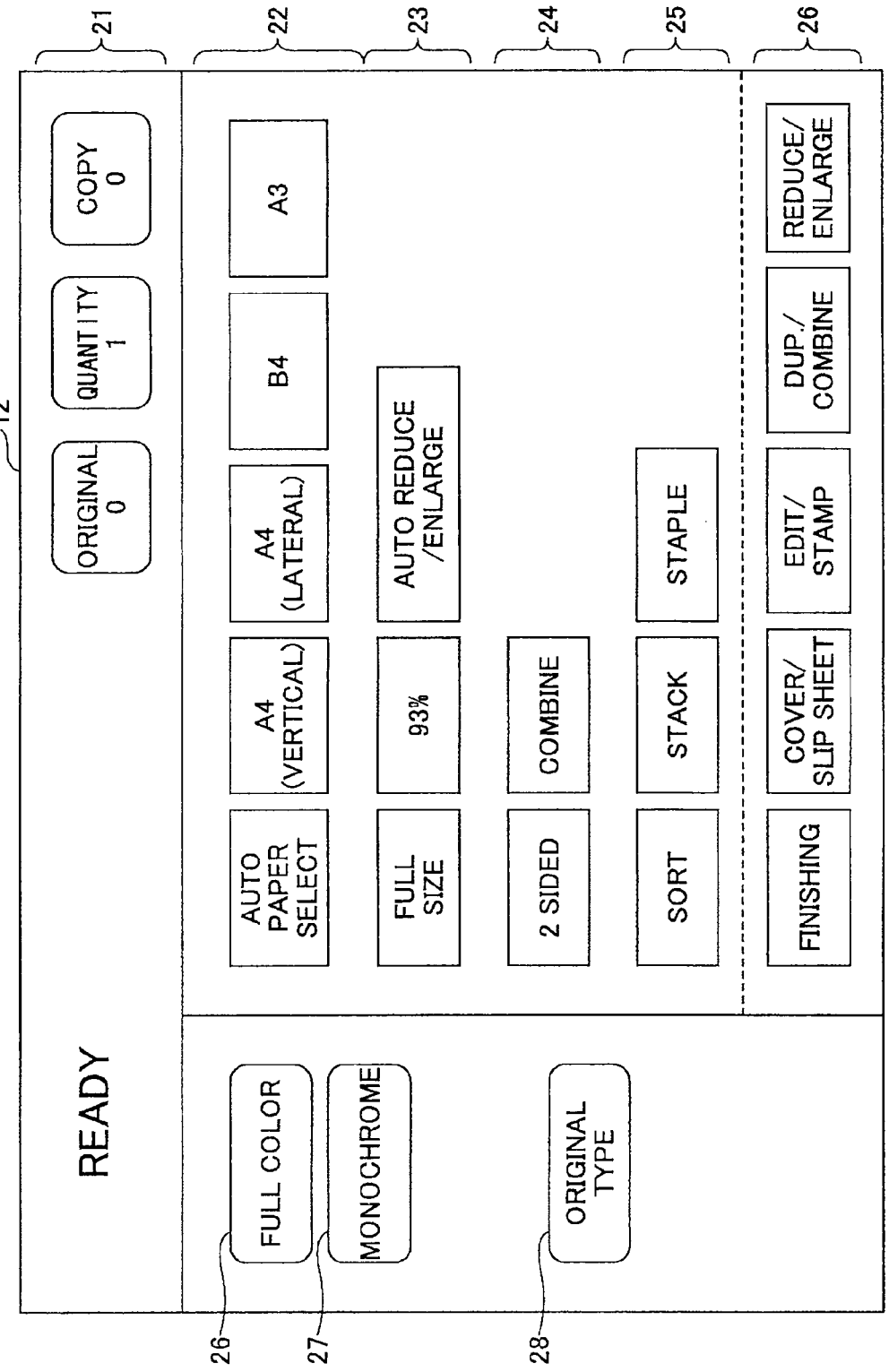
FIG. 3 is a drawing showing an exemplary screen displayed on a liquid crystal display section when the "Copy" key in FIG. 2 is pressed.

FIG. 3 shows an example of the screen (menu) displayed on the liquid crystal display section 12 when the "Copy" key 11a of FIG. 2 is pressed. Such screens (menus) are generated by the screen control section 10 using necessary information obtained from the system control section 4. In this example of FIG. 3, a message "READY" is displayed in the upper row. In the same row, quantity information 21 indicating "ORIGINAL 0", "QUANTITY 1", and "COPY 0" is displayed. The information "ORIGINAL" indicates the number of original pages (papers) having been read by the image forming apparatus 100. The information "QUANTITY" indicates the number of sets of pages (papers) to be copied. The information "COPY" indicates the number of pages (papers) actually copied.

Further, in the left lower column of the liquid crystal display section 12, a "Full color" button 26, a "Monochrome" button 27, and an "Original type" button 28 are displayed. In the following, when it is not necessary to describe a specific button, a general term "button(s)" may be used. The "Full color" button 26 is used by a user to instruct the image forming apparatus 100 that the original document (data) is colored. The "Monochrome" button 27 is used by a user to instruct the image forming apparatus 100 that the original document is monochrome. The "Monochrome" button 27 is selected as a default setting. Therefore, unless the "Full color" button 26 is pressed, the original is copied and the like as a monochrome original document. When the "Original type" button 28 is pressed, "Text", "Text/Photo", "Photo", "Pale", "Generation Copy" buttons and the like are displayed for appropriately setting the type of the original document (otherwise, these buttons may be already displayed even if the "Original type" button 28 is not pressed).

Further, in the lower right part of the liquid crystal display section 12, a paper selecting section 22, a reduce/enlarge setting section 23, a print mode setting section 24, a special setting section 25, and a detail setting section 26 are displayed.

The paper selecting section 22 includes buttons for designating the size of the paper on which the original document is copied. The buttons include an "Auto Paper Select" button, an "A4 (vertical)" button, an "A4 (lateral)" button, a "B4" button, and an "A3" button. The characters such as "A4" displayed on the buttons are obtained by detecting the size of the paper set in the sheet tray. The "Auto Paper Select" button is selected as the default setting.

The reduce/enlarge setting section 23 includes buttons for selecting the magnification ratio when a user copies the original document (original). The buttons include a "Full size" button, a "93%" button, and a "Reduce/Enlarge" button. When the "Reduce/Enlarge" button is selected (pressed), the image forming apparatus 100 automatically adjusts the magnification ratio based on the paper size set by a user and the detected size of the original document in the sheet tray.

The print mode setting section 24 includes buttons for selecting a printing mode such as the double-sided (2-sided) printing and the combined printing. The buttons include a "2-sided" button and a "Combine" button. For example, when the "2-sided" button is selected (pressed), the data on both sides of the original are copied onto the corresponding sides of the paper. When the "Combine" button is selected (pressed), the data of two single sides of the originals are combined into one side of the paper. The print mode setting section 24 may further includes a "One-sided Combine" button and a "Two-sided Combine" button and the like.

The special setting section 25 includes buttons for setting (performing) special processes such as sorting, stacking, and stapling. The buttons include a "Sort" button, a "Stack" button, and a "Staple" button. When the "Sort" button is selected (pressed), the copied sheets arranged in sequential order are output by the sets. When the "Stack" button is selected (pressed), the copied sheets are output in a manner such that the sheets of the same page are output in the same place (set) when the image forming apparatus 100 is equipped with a sort tray or a finisher. When the "staple" button is selected (pressed), the copied sheets are stapled by the set.

The detail setting section 26 includes buttons for performing detailed settings of sorting, stapling, and hole punching. The buttons include a "Finishing" button, a "Cover/Slip Sheet" button, an "Edit/Stamp" button, a "Dup./Combine" button, and a "Reduce/Enlarge" button. The buttons in the detail setting section 26 differ from those in the paper selecting section 22, the reduce/enlarge setting section 23, the print mode setting section 24, and the special setting section 25 in that when the buttons in the detail setting section 26 are pressed, another screen (menu) or a small screen (menu) is displayed. For example, when the "Finishing" button is pressed, another screen is displayed and a user may set detailed settings of sorting, stapling and punching operations.

For example, when a user sets the conditions to perform double-sided printing on A4-sized paper from a color original, the user performs the following setting steps.
(1) Press the "Full color" button
(2) Press the "A4" button (or "Auto Paper Select" button)
(3) Press the "Dup./Combine" button
(4) Press a "2-sided→2-sided" button
In the image forming apparatus 100 according to this example, it may become possible to reduce the work burden of the disabled using such settings as described in this example.

User Interface for the Disabled

An able-bodied person would copy the original by setting without changing screens in an ordinary print setting or by setting by changing screens once or twice in special print settings. However, the disabled may have difficulty moving the hands, which means that the disabled may have difficulty selecting (pointing at) especially small buttons as shown in FIG. 3 as it is desired. Therefore, the image forming apparatus 100 according to this embodiment of the present invention provides special screens for the disabled in addition to the screens for able-bodied persons, so that the disabled may easily set the copying conditions and the like in using the image forming apparatus 100.

FIGS. 4A through 4C shows an example of the transition of the screens of the image forming apparatus 100 provided for the disabled. To go into the screen (mode) for the disabled, a predetermined special operation such as prolonged button pressing (pressing and holding the button for a predetermined time period) is performed. For example, by performing of the special operation by a user who uses the image forming apparatus 100, the screen for the disabled as shown in FIG. 4A is displayed, so that the disabled can more easily operate the image forming apparatus 100.

In the image forming apparatus 100, as schematically illustrated in FIGS. 4A through 4C, moving buttons displayed on the liquid crystal display section 12 move from the right to the left. Herein, the "moving button" refers to a button that indicate its setting item as shown in FIG. 3 and that moves as schematically illustrated in FIGS. 4A through 4C as time passes.

In FIG. 4A, a moving "Copy" button 101 moves from the right to the left in the uppermost area (first line) of the liquid crystal display section 12. In the same manner, a moving "DocumentBox" button 102 moves from the right to the left with a little delay from the moving "Copy" button 101 in the middle area (second line) of the liquid crystal display section 12. Further, a moving "SEND" button 103 moves from the right to the left with a little delay from the moving "DocumentBox" button 102 in the lowermost area (third line) of the liquid crystal display section 12.

FIG. 4A shows a case where three moving buttons are simultaneously displayed in the liquid crystal display section 12. However, the number of moving buttons to be simultaneously displayed in the liquid crystal display section 12 may be adequately determined in accordance with the size of the liquid crystal display section 12 and the sizes of the moving buttons, or may be determined (set) by a user. For example, when the size of the liquid crystal display section 12 is not large enough to display all the selectable buttons (in this case, five buttons) simultaneously, a moving "PRINTER" button may move from the right to the left in the uppermost area (first line) of the liquid crystal display section 12 with a little delay from the moving "SEND" button 103. Further, in this case, the moving "Scanner" button may move from the right to the left in the middle area (second line) of the liquid crystal display section 12 with a little delay from the moving "PRINTER" button.

As described above, by slightly shifting the header positions of the moving buttons, it may become easier to prevent erroneous operations. Preferably, the header positions of the moving buttons may be shifted in a manner such that adjoining moving buttons do not overlap in the vertical direction of the liquid crystal display section 12. Namely, preferably, the header position in the vertical direction of the moving button is shifted to the right side of the tail end position in the vertical direction of the preceding moving button (when moving buttons move from the right to the left). However, the present invention is not limited to this configuration. For example, the header positions of the moving buttons may be positioned at the same position in the vertical direction of the liquid crystal display section 12. Further, the header positions of the moving buttons may be randomly positioned (determined) in the vertical direction of the liquid crystal display section 12.

By having the above configuration, the disabled may easily start setting conditions of the image forming apparatus 100 to use his/her desired function by selecting the corresponding desired moving button(s). In this case, only selectable buttons are displayed; therefore, the disabled may easily select his/her desired moving button from among a limited (reduced) number of choices (moving buttons) while waiting for at most two or three screens. Because of this feature, it may become possible for the disabled to prevent erroneous pressing or the like and improve the usability of the image forming apparatus 100.

As illustrated in FIGS. 4A through 4C, when the disabled presses the moving "Copy" button 101, the screen control section 10 controls displaying the screen shown in FIG. 4B. In this case, when the moving "Copy" button 101 is pressed, the screen control section 10 controls displaying and move the moving buttons based on display data of the moving buttons and other necessary information acquired from the system control section 4.

In the left side of FIG. 4B, a moving "ColorDocument" button 104 moves from the right to the left in the uppermost area (first line) of the liquid crystal display section 12. In the same manner, a moving "Duplex" button 105 moves from the right to the left with a little delay from the "ColorDocument" button 104 in the second line of the liquid crystal display section 12. Further, a moving "Finish" button 106 moves from the right to the left with a little delay from the moving "Duplex" button 105 in the third line of the liquid crystal display section 12. Further, a moving "Back" button 107 moves from the right to the left with a little delay from the moving "Finish" button 106 in the third line of the liquid crystal display section 12.

The moving "Back" button 107 in the left side of FIG. 4B is used to go back to the previous screen of FIG. 4A. The moving "Finish" button 106 is used to let the image forming apparatus 100 know that the settings of copy conditions are completed. Preferably, these two buttons 106 and 107 may be displayed in the respective same lines among all the screens. Further, these two buttons 106 and 107 are likely to be selected in any screen; therefore, these two buttons 106 and 107 may be displayed in fixed positions (without being moved) of the liquid crystal display section 12. However, in the following screens in the figures, these two buttons 106 and 107 may be omitted for simplification and explanatory purposes.

Further, in addition to the moving "ColorDocument" button 104 and the moving "Duplex" button 105, to make it possible to select the size of the paper, a moving "Reduce/Enlarge" button 110, a moving "93%" button 111, and an "Auto Reduce/Enlarge" button 112 are displayed and moved after the moving "Back" button 107 as shown in the middle part of FIG. 4B. Further, to make it possible to select the size of the paper, a moving "A4" button 113, a moving "B4" button, and a moving "A3" buttons are displayed and moved as shown in the right side of FIG. 4B.

Further, in this case, the default setting of reducing/enlarging the size is "Full size", and the default setting of paper size to be selected is "Auto Paper Select". Because of this default setting, the disabled may complete the setting of copying conditions without setting those conditions.

When some of the moving buttons shown in the screens of FIG. 4B are selected, the display of the moving buttons is reversed. On the other hand, when some other moving buttons are selected, more detailed corresponding setting screens are newly displayed. For example, when the moving "Duplex" button 105 or the moving "Reduce/Enlarge" button 110 is pressed, a more detailed corresponding setting screen is newly displayed.

FIG. 4C shows an exemplary screen displayed when the moving "Duplex" button 105 is pressed in the screen on the left side of FIG. 4B. As shown in FIG. 4C, a moving "1 sided→2 sided" button 108 moves from the right to the left in the uppermost area (first line) of the liquid crystal display section 12. In the same manner, a moving "2 sided→2 sided" button 109 moves from the right to the left with a little delay from the moving "1 sided→2 sided" button 108 in the second line of the liquid crystal display section 12. Further, the moving "Back" button 107 moves from the right to the left in the lowermost area of the liquid crystal display section 12.

The moving "1 sided→2 sided" button 108 is used (pressed) to print data on one side of the original papers onto both sides of the papers to be printed; and the moving "2 sided→2 sided" button 109 is used (pressed) to print data on both sides of the original papers onto both sides of the papers to be printed, respectively, in the image forming apparatus 100.

Figure 5:
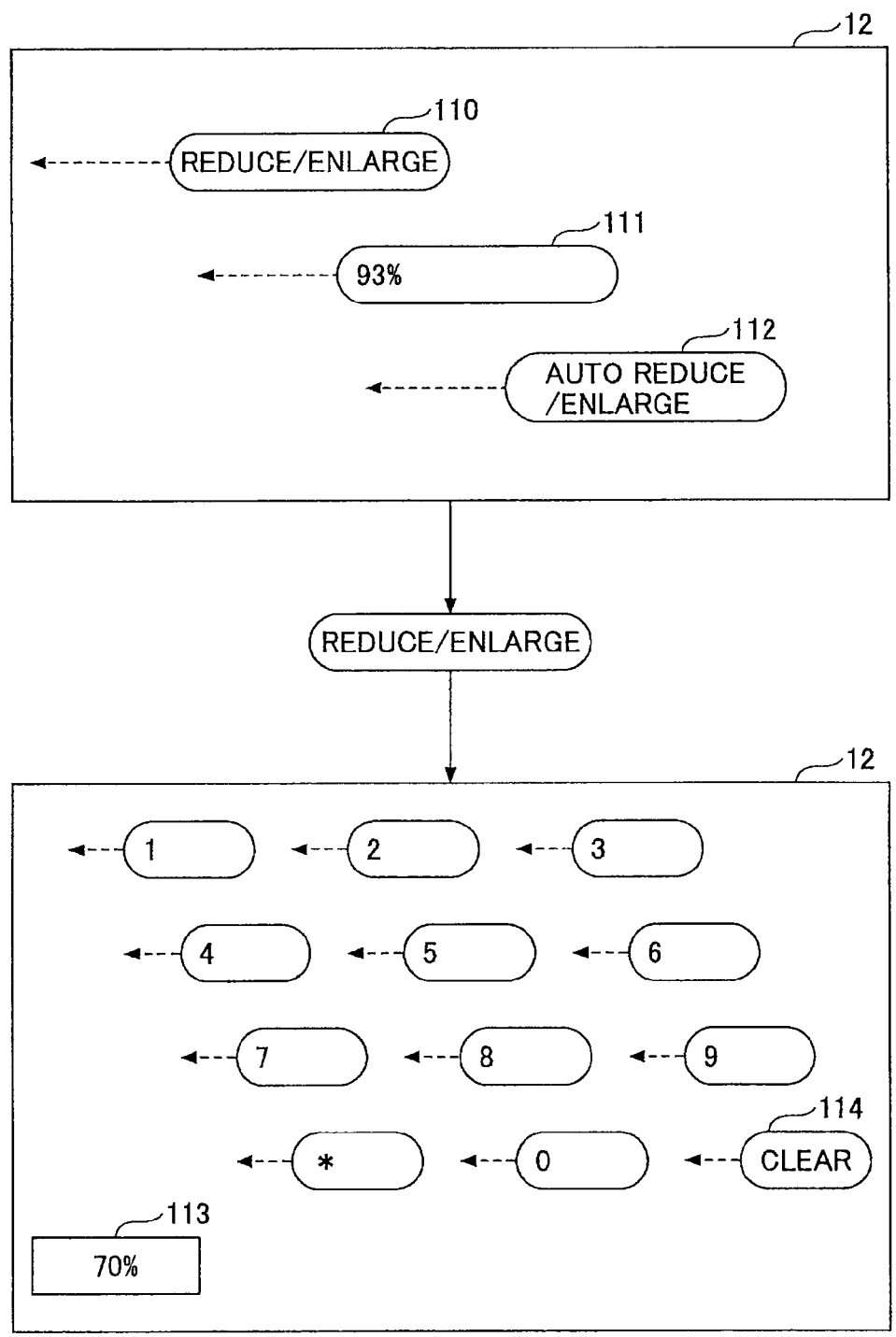
FIG. 5 is a drawing showing an example of screen transition when the "Reduce/Enlarge" button is pressed.

FIG. 5 shows an example of transition of the screens when the moving "Reduce/Enlarge" button 110 is selected (pressed). As shown in FIG. 5, when the moving "Reduce/Enlarge" button 110 is selected (pressed), moving "1, 2, 3, 4, 5, 6, 7, 8, 9, and 0" (numeric) buttons are displayed and moved in the liquid crystal display section 12. In this figure, for explanatory purposes, all of the 10 moving buttons are simultaneously displayed in the liquid crystal display section 12. However, preferably, for example, only three moving (numeric) buttons may be arranged to be displayed at the same time, so that the disabled may select the desired moving button more easily. In this case, for example, when the disabled selects the numbers one by one, the selected numbers are sequentially input into the Reduce/Enlarge box 116 in the lower left side of the liquid crystal display section 12 from the hundreds place. Further, when the disabled presses a moving "Clear" button 117, the numbers having been input in the Reduce/Enlarge box 116 are cleared (reset). The default value set in the Reduce/Enlarge box 116 is, for example, 100(%).

For example, to set the conditions to perform colored double-sided printing on A4-sided paper from a color original, the disabled sequentially may press the moving "Copy" button 101, the moving "ColorDocument" button 104, the moving "Duplex" button 105, and the moving "2 sided→2 sided" button 109. Therefore, by sequentially selecting the moving buttons moving in the screens, it may become possible to complete setting the same copying conditions that can be set by the able-bodied persons.

In FIGS. 4A through 4C and FIG. 5, a case is described where the moving buttons are moved from the right to the left in the liquid crystal display section 12. However, the present invention is not limited to this configuration. For example, the moving buttons may be moved in the direction from the left to the right, from the upper side to the lower side, or from lower side to the upper side in the liquid crystal display section 12.

Further, only one moving button may be displayed in a single screen. In this case, the following moving button may be arranged to be displayed and moved in the same line where the touching (pressing) operation on the preceding moving button by the disabled is detected. By displaying and moving the moving button in this way, it may become possible to minimize the workload of the operations for the disabled.

Functional Block

Figure 6:
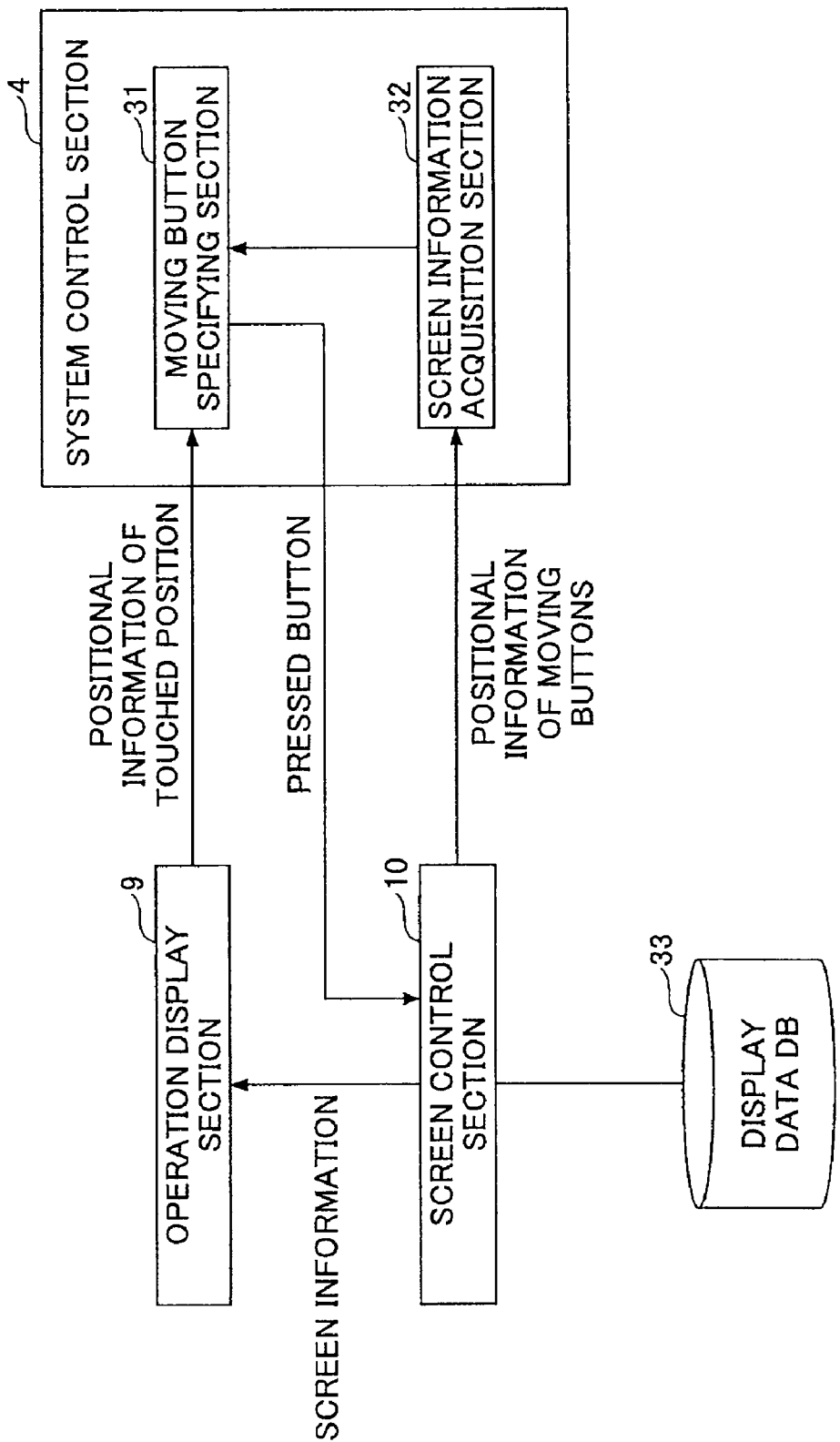
FIG. 6 is a drawing showing an exemplary functional block diagram of the image forming apparatus according to the first example of the first embodiment of the present invention.

FIG. 6 shows an exemplary functional block diagram of the image forming apparatus 100. The same reference numerals are used for the same or equivalent elements shown in FIG. 1, and the description thereof may be omitted. The function of the system control section 4 is realized by executing a program by the CPU of the system control section 4. As shown in FIG. 6, the system control section 4 includes a moving button specifying section 31 and a screen information acquisition section 32.

The operation display section 9 detects a position (touched position) where the touch panel integrated into the liquid crystal display section 12 is touched (pressed). Then, the operation display section 9 transmits the information of the touched position (positional information) to the system control section 4. The moving button specifying section 31 acquires this positional information, and specifies the moving button selected by the disabled based on the moving button displayed on the liquid crystal display section 12.

Figure 4:
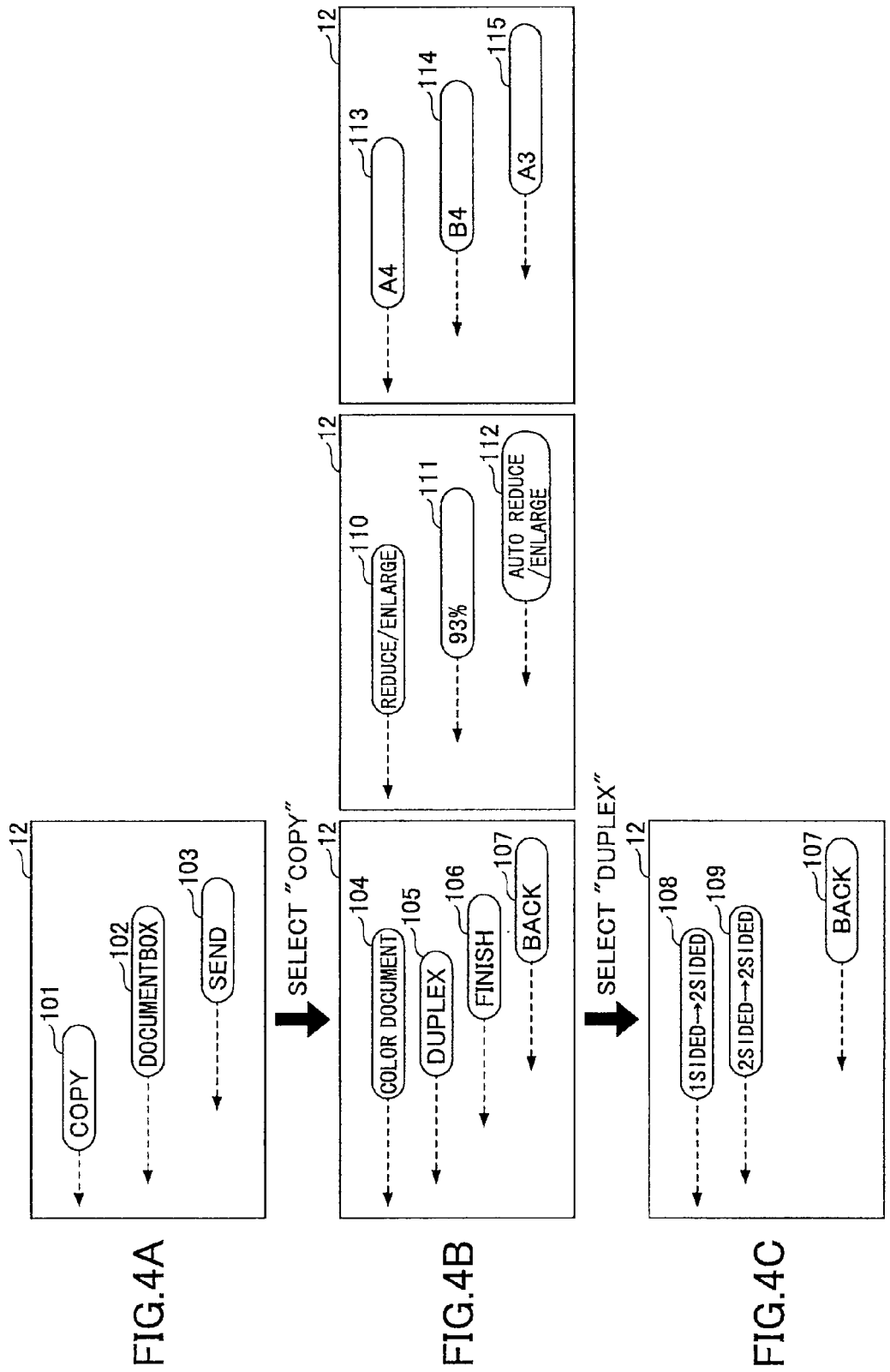
FIGS. 4A through 4C are drawings showing an example of screen transition of display screens for the disabled.

The screen control section 10 displays the screens described with reference to FIGS. 4 and 5 on the liquid crystal display section 12. More specifically, from the system control section 4, the screen control section 10 acquires the information indicating which of the hard keys 11, the ten keys 13, or the moving keys is pressed. Then, based on the acquired information, the screen control section 10 determines the screen to be displayed. However, alternatively, the system control section 4 may determine the screen to be displayed, and the screen control section 10 may follow the instruction from the system control section 4 to display the screen determined by the system control section 4. In any of the cases, the screen control section 10 or the system control section 4 contains screen transition information depending on the pressed hard keys 11 and moving buttons (i.e. information indicating which screen is to be displayed next depending on the currently displayed screen and the pressed key in the current screen).

When the screen to be displayed is determined, the screen control section 10 further acquires various information related to the display and the function of the image forming apparatus 100 from the system control section 4. For example, such information includes a signal indicating the paper jam and malfunction, the size of the papers stacked in the paper tray, available options (e.g. staple, punch, and binding unit) and the like.

The screen control section 10 generates a screen based on the information acquired from the system control section 4 and the display data. The display data required to generate the screen are stored in a display data DB 33. The display data DB 33 stores the data that are associated with the screen to be displayed and that are used for forming the moving buttons.

FIG. 7 shows a schematic example of the display data. The display data in FIG. 7 are for the "Screen A" which is used for the screen of FIG. 4A. In FIG. 7, the button information identifies each moving button displayed in the same screen and indicates the function of the button. The moving buttons 1, 2, and 3 of the button information correspond to the first, second, and third lines of the screen when those buttons are displayed in the screen.

The frame shape information refers to file information representing the shape of the frame of the moving button using a predetermined format.

The character information is a character code or the like representing the characters, symbols, and figures to be superimposed on the moving button. Alternatively, the frame shape information and the character information may be integrally treated and stored in the bitmap format.

The positional information indicates the display position of the moving button. For example, the positional information may specify the pixel positions in the vertical and lateral directions. For example, the positional information indicates the initial values (positions) right after the screen is switched on (displayed).

The screen control section 10 displays the moving buttons in a manner such that the moving buttons start moving from the respective initial positions and move at a predetermined moving speed. More specifically, every predetermined time cycle, the screen control section 10 determines the positions of the moving buttons based on the respective moving speeds. By making the predetermined time cycle sufficiently short, the disabled could see the moving buttons as if they are moving.

When the positions of the moving buttons are determined, the information to display the screen can be generated. Namely, the positions of the moving buttons 1 through 3 are determined, the moving buttons 1 through 3 being instantaneously displayed in the liquid crystal display section 12 and including the characters to be displayed and the like. In the following, this information is called "screen information".

Whenever determining the positions of the moving buttons, the screen control section 10 transmits the respective screen information to the operation display section 9. Based on the received screen information, the operation display section 9 displays the screen on the liquid crystal display section 12.

Further, the screen control section 10 transmits the determined positional information of the moving buttons to the system control section 4. As a result, the moving button specifying section 31 of the system control section 4 specifies which moving button is pressed by the disabled based on the positional information of the moving buttons when the moving button is pressed and the positional information of the touched position acquired from the operation display section 9.

Operating Procedure

Figure 8:
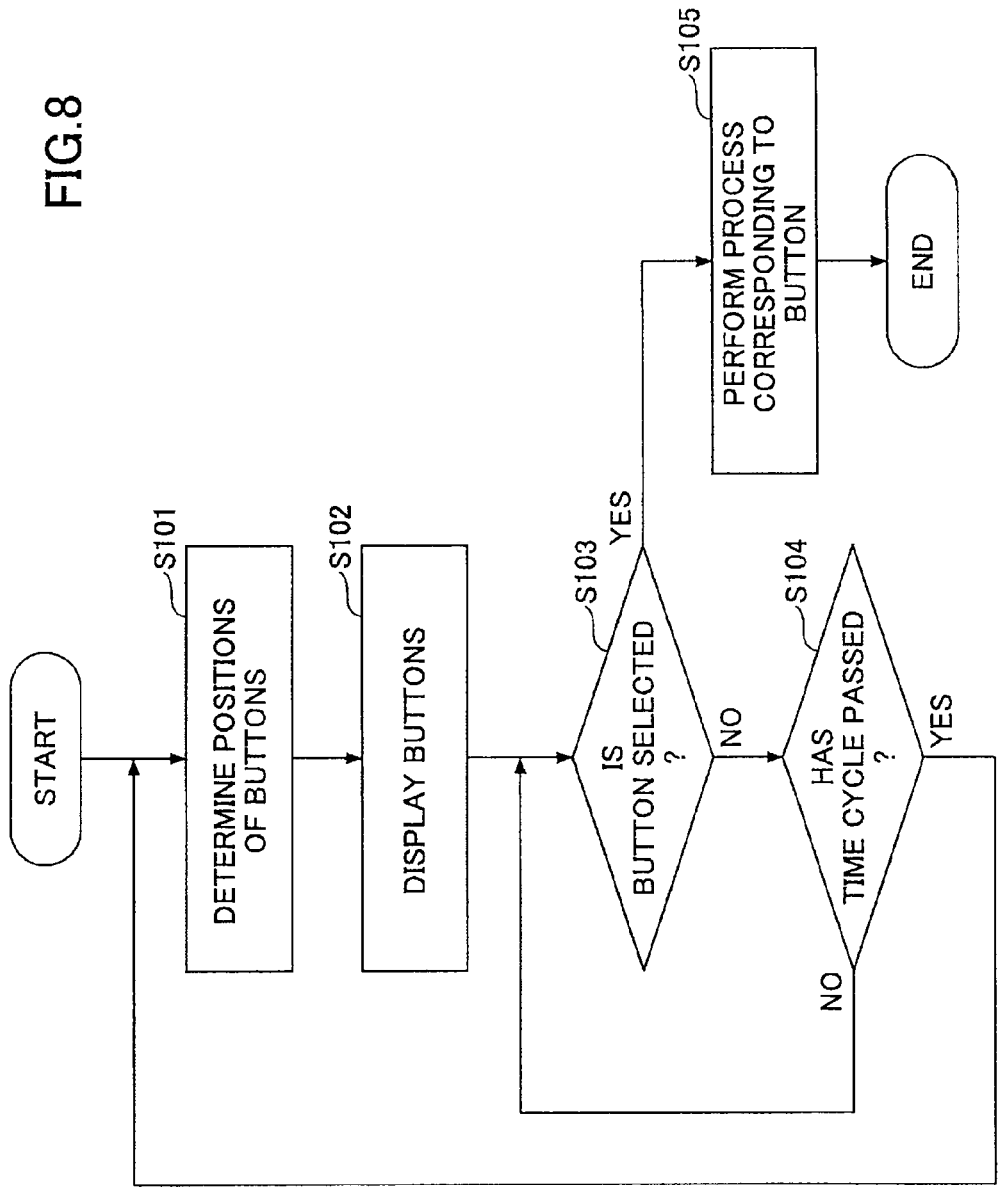
FIG. 8 is an exemplary flowchart showing a case where a moving button is moved and a pressed moving button is specified in the image forming apparatus (first example)

FIG. 8 is an exemplary flowchart showing a process of moving the moving buttons and specifying the pressed moving button in the image forming apparatus 100.

The process of the flowchart in FIG. 8 starts when, for example, the image forming apparatus 100 is operated to display the screen for the disabled.

The screen control section 10 determines the positions of the moving buttons (step S101). More specifically, in this step, the screen information acquisition section 32 of the system control section 4 acquires the positional information of the moving buttons calculated every predetermined time cycle by the screen control section 10. Further, the screen control section 10 transmits the screen information to the operation display section 9.

Based on the received screen information, the operation display section 9 displays the screen on the liquid crystal display section 12 (step S102). The display of the liquid crystal display section 12 is refreshed (updated) at its refresh rate. Therefore, if the refresh rate is shorter than the predetermined time cycle, the display of the moving buttons may be repeated without moving the positions of the moving buttons.

Next, the operation display section 9 detects whether the touch panel is pressed by the disabled (step S103). When determining that the pressing operation on the touch panel is not detected (NO in step S103), it is assumed that the disabled is still waiting for the display of the desired touch panel or is in the selecting (pressing) operation. In this case (NO in step S103), the screen control section 10 determines whether the predetermined time cycle has passed (step S104). When determining that the predetermined time cycle has not passed (NO in step S104), the process goes back to step S103, where the operation display section 9 continues (repeats) to detect whether the touch panel is pressed.

When operation display section 9 does not detect that touch panel is pressed and the predetermined time cycle has passed (YES in step S104), the process goes back to step S101, so that the screen control section 10 repeats the process from step S101. Namely, the screen control section 10 calculates the positions of the moving buttons again.

On the other hand, in step S103, when the pressing operation to the touch panel is detected (YES in Step S103), the moving button specifying section 31 of the system control section 4 specifies the pressed moving button based on the positional information of the moving buttons and the positional information indicating which position of the touch panel is pressed. When the pressed moving button is specified, the system control section 4 performs the process (function) corresponding to the pressed moving button (step S105). For example, the system control section 4 may cause the screen control section 10 to determine the pressed button or screen to be displayed next, or may cause the plotter 2 to perform the print operation.

As described above, in the image forming apparatus 100 according to this example of this embodiment of the present invention, it may become possible for the disabled to set the same copying conditions as set by the able-bodied person simply by sequentially selecting the necessary or selectable moving buttons displayed on the screen.

SECOND EXAMPLE

In this second example, an image forming apparatus 100 is described in which the size of the moving button can be changed depending on the frequency of use (use frequency) of the moving button. In this case, for example, the moving button having been frequently used may be enlarged, so that the moving button can be found and pressed more easily. As a result, it may become possible to improve the usability of the image forming apparatus 100.

Figure 9:
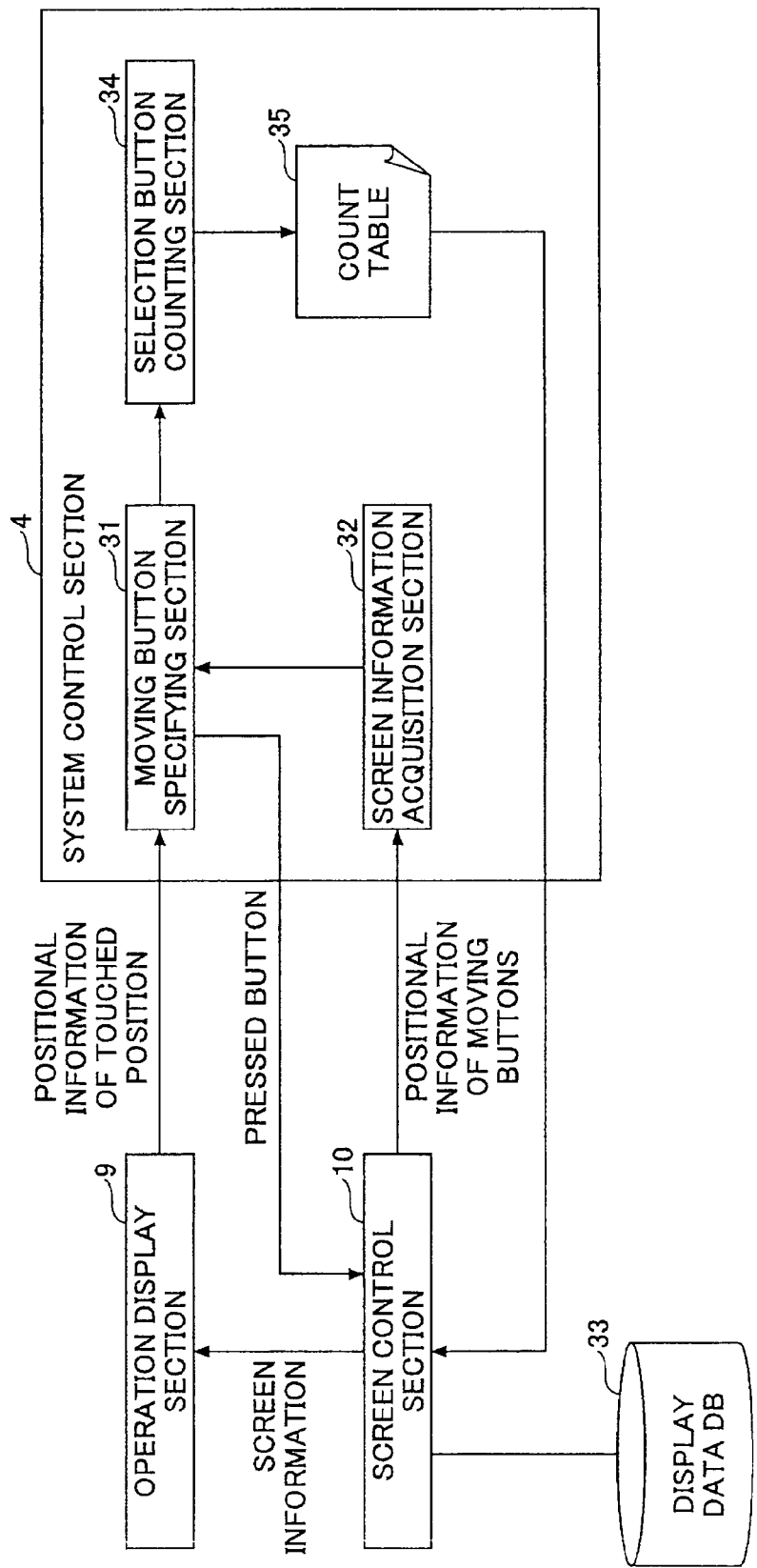
FIG. 9 is an exemplary functional block diagram of an image forming apparatus according to a second example of the first embodiment of the present invention.

FIG. 9 shows an exemplary functional block diagram of the image forming apparatus 100 according to this example. The same reference numerals are used in FIG. 9 for the same or equivalent elements in FIG. 6, and the description thereof is omitted. As shown in FIG. 9, the system control section 4 further includes a selection button counting section 34 and a count table 35. The selection button counting section 34 counts the number of times the keys are pressed, and the counted numbers (values) are stored in the count table 35. More specifically, for example, the selection button counting section 34 accumulates the number of pressed times for each moving button in the past or in a predetermined time period (e.g., one week or one month) in the past.

FIG. 10 schematically illustrates an example of the count table 35. This example of FIG. 10 shows that the moving "Copy" button 101 has been pressed "123 times", the moving "DocumentBox" button 102 has been pressed "2 times", and the moving "SEND" button 103 has been pressed "7 times".

Further, preferably, the disabled may be identified by using his/her IC card or the like, so that the counted values for each disabled can be stored in the count table 35.

The screen control section 10 reads the count table 35 from the system control section 4 every predetermined time period when generating the screen information in a case where the power of the image forming apparatus 100 is turned ON or the image forming apparatus 100 is operated so as to display the screen for the disabled. Then, the screen control section 10 determines the sizes of the frame and the characters of the moving buttons based on the previously stored information regarding the relationship between the number of pressed times and the sizes.

FIG. 11A is an example of the table showing the relationship between the number of pressed times and the corresponding sizes. This example of FIG. 11A shows that the number of pressed times in a range from 0 to 5 corresponds to a "small" size; the number of pressed times in a range from 6 to 10 corresponds to a "medium" size; and the number of pressed times equal to or more than 11 corresponds to a "large" size. In this example, the sizes are classified into three categories. However, for example, more than three categories may be used. Further, the ranges of the number of pressed times described in FIG. 11A are one example only.

FIG. 11B shows an example of display data. In FIG. 11B, the same terms and symbols are used for the same or equivalent terms and symbols in FIG. 7, and the description thereof is omitted. As shown in FIG. 11B, the data of the frame shape information corresponding to the sizes "small", "medium", and "large" are stored in this display data. Similarly, the data of the character information corresponding to the sizes "small", "medium", and "large" are also stored in this display data. By having the data in this way, it becomes possible to select the moving buttons having any of small, medium, and large size frame. Further, it becomes possible to display the character (e.g. "Copy") having (using) any of small, medium, and large sizes (font sizes). Further, the data of the positional information may further be stored for each of the sizes.

Figure 12:
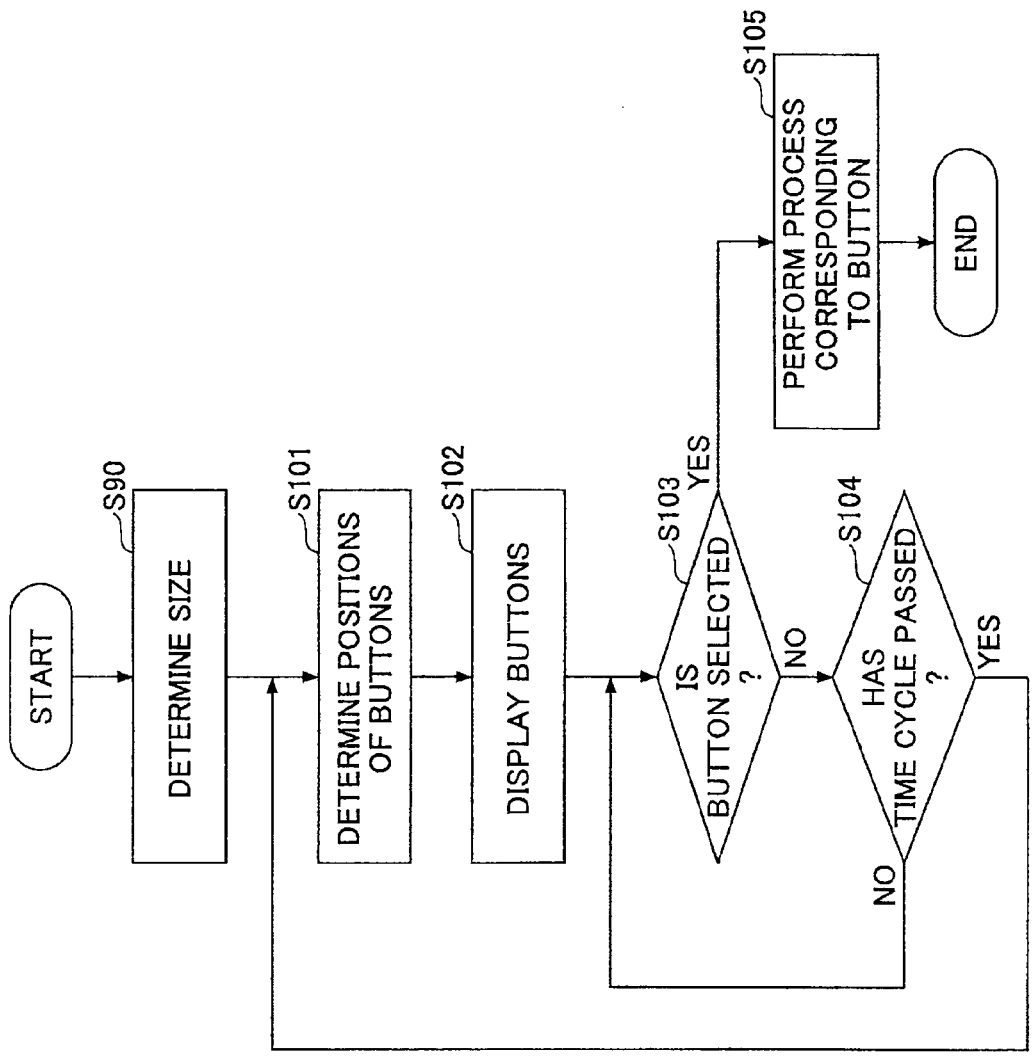
FIG. 12 is an exemplary flowchart showing a case where a moving button is moved and a pressed moving button is specified in the image forming apparatus (second example)

FIG. 12 is an exemplary flowchart showing a process of moving the moving buttons and the specifying the pressed moving button in the image forming apparatus 100. In FIG. 12, the same step numbers are used for the same steps as those in FIG. 8.

First, the screen control section 10 reads the number of pressed times from the count table 35, the number having been counted in the past for each moving button included in the screen to be displayed. Then, the screen control section 10 determines the size of each of the moving buttons (step S90). Namely, the screen control section 10 determines (specifies) the size of each of the moving buttons by referring to a table as shown in FIG. 11A using the corresponding number of pressed times. Then, the screen control section 10 refers to the display data as shown in FIG. 11B to read (derive) the frame shape information and the character information of each of the moving buttons corresponding to the determined sizes of the moving buttons.

For example, according to the count table 35 of FIG. 10 and the relationship between the number of pressed times and the sizes shown in FIG. 11A, the size of the moving "Copy" button 101 (pressed 123 times) is determined to be "large"; the size of the moving "DocumentBox" button 102 (pressed 2 times) is determined to be "small"; and the size of the moving "SEND" button 103 (pressed 7 times) is determined to be "medium".

After determining (specifying) the sizes, the screen control section 10 determines the positions of the moving buttons (step S101). More specifically, the screen control section 10 calculates the positional information (positions) of the moving buttons every predetermined time cycle. Then, the screen control section 10 generates the screen information indicating that the moving buttons having the specified sizes are formed on the positions in accordance with the calculated positional information.

Based on the process described above, the operation display section 9 displays the screen on the liquid crystal display section 12 (step S102). The processes of steps S103 to S105 in FIG. 12 are the same as those in the first example, and their repeated description is omitted.

Figures 13, 14:
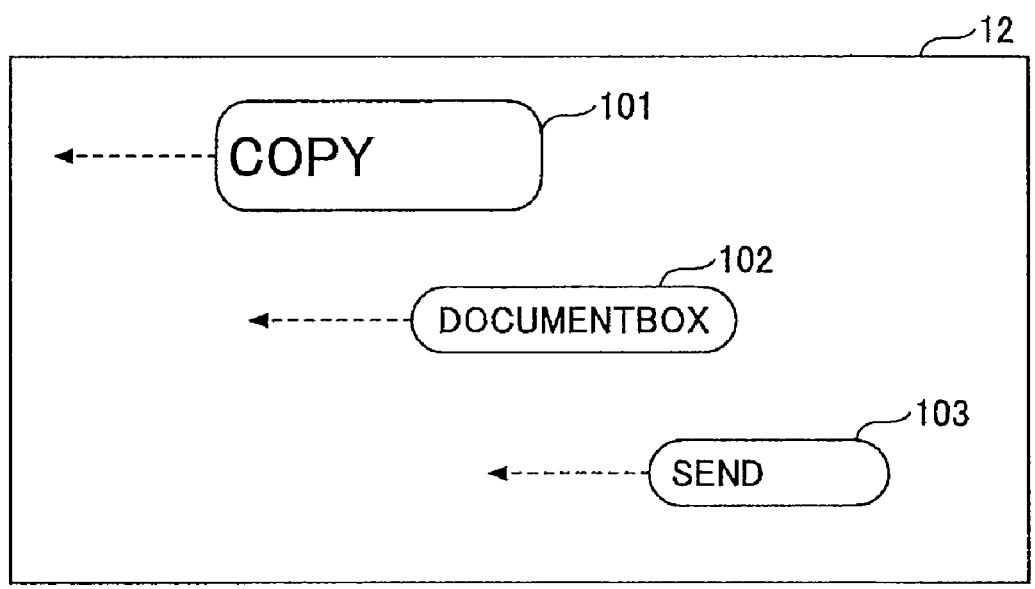
FIG. 13 is a drawing showing an example of a screen displayed on the liquid crystal display section.
FIG. 14 is a table showing a relationship between the number of pressing buttons and the moving speed of the buttons according to a third example of the first embodiment of the present invention.

FIG. 13 illustrates an exemplary screen displayed on the liquid crystal display section 12. As shown in FIG. 13, the moving "Copy" button 101 (pressed 123 times) is displayed in "large" size; the moving "DocumentBox" button 102 is displayed in "small" size; and the moving "SEND" button 103 is displayed in "medium" size. As described above, the moving "Copy" button 101 having been frequently used (pressed) is displayed in "large" size. Therefore, the moving "Copy" button 101 can be found more easily. Further, the moving "Copy" button 101 can be pressed more easily by the disabled.

As described above, by using the image forming apparatus 100 according to this second example, it may become possible to further improve the usability and operability of the image forming apparatus 100 for the disabled.

THIRD EXAMPLE

In this third example, an image forming apparatus 100 is described in which the moving speed of the moving button can be changed depending on the frequency of use of the moving button. For example, by decreasing the moving speed of the moving button which has been frequently selected (slow mode), the disabled may press the moving button more securely. On the other hand, by increasing the moving speed of the moving button which has been frequently selected (fast mode), the disabled may complete the setting in a shorter time period. Which mode can be selected (set) can be set in this image forming apparatus 100. In practical use, for example, it may be preferable that the slow mode is selected when a severely disabled person mainly uses the image forming apparatus 100 and the fast mode is selected when a slightly disabled person mainly uses the image forming apparatus 100. In the following description, the slow mode is mainly described.

Further, the functional block diagram and the counter table used in this example are the same as those used in the above second example; therefore their repeated description is omitted.

FIG. 14 is an example of a table stored in the screen control section 10, and the table includes the information regarding the relationship between the number of pressed times and the moving speed (speed) of the moving button. This example of FIG. 14 shows that the number of pressed times in a range from 0 to 5 corresponds to a "fast" speed; the number of pressed times in a range from 6 to 10 corresponds to a "medium" speed; and the number of pressed times equal to or more than 11 corresponds to a "slow" speed. In this example, the moving speed is classified into three levels. However, for example, more than three levels may be used. Further, the ranges of the number of pressed times described in FIG. 14 are one example only.

In this third example, the display data the same as those used in the above second example may be used. In the above first example, the moving speed of the moving buttons are the same as each other. However, in this third example, the screen control section 10 specifies speed information of the moving buttons, and calculates the positions of the moving buttons based on the specified speed information.

In this case, the screen control section 10 previously determines, for example, a moving amount (distance) per time cycle associated with the corresponding speed information. By doing this, it may become possible to reduce the calculation amount when determining the positions of the moving buttons every predetermined time cycle.

Figure 15:
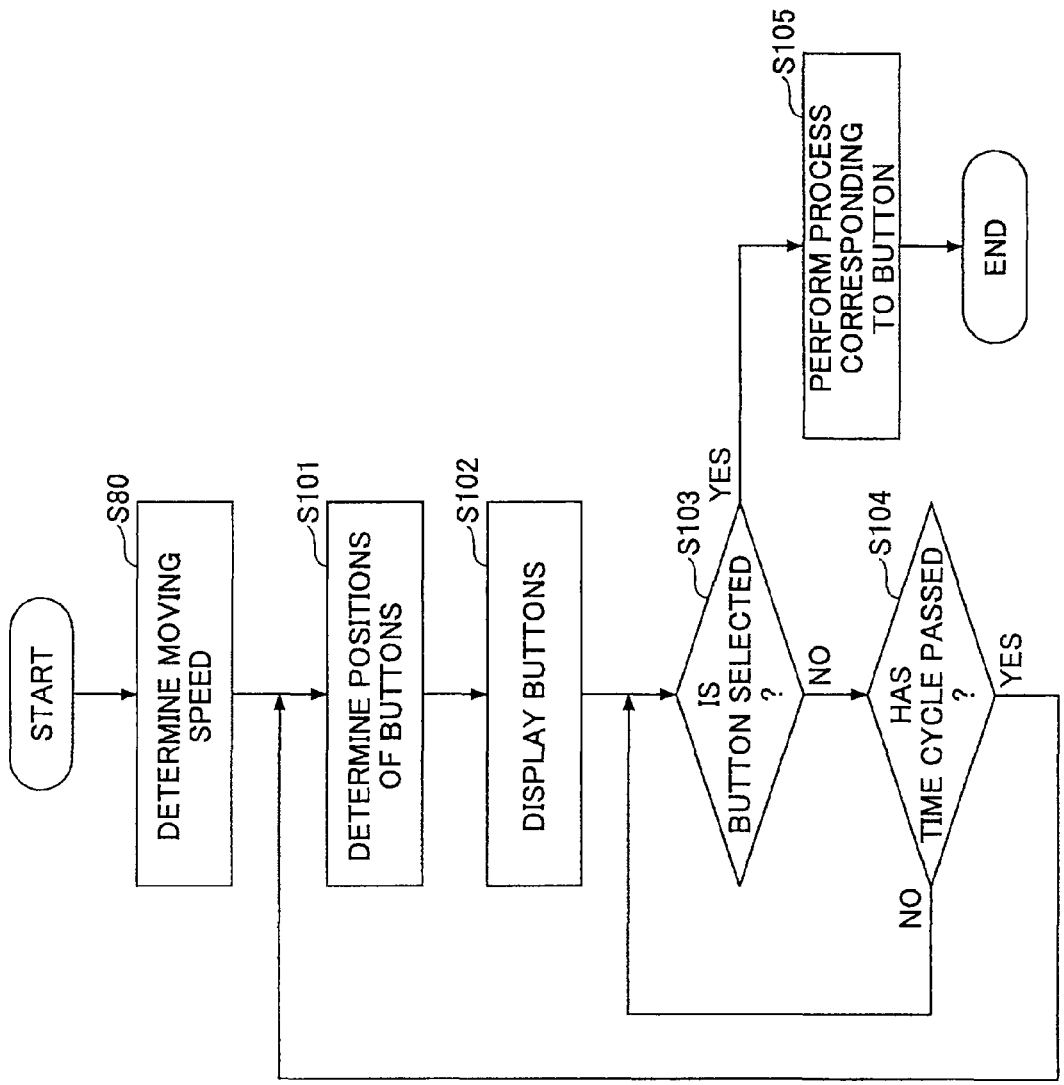
FIG. 15 is an exemplary flowchart showing a case where a moving button is moved and a pressed moving button is specified in the image forming apparatus (third example)

FIG. 15 is an exemplary flowchart showing a process of moving the moving buttons and specifying the pressed moving button in the image forming apparatus 100. In FIG. 15, the same step numbers are used for the same steps as those in FIG. 8.

First, the screen control section 10 reads the number of pressed times from the count table 35, the number of pressed times having been counted in the past for each moving button included in the screen to be displayed. Then the screen control section 10 determines the moving speeds of the moving buttons (step S80). Namely, the screen control section 10 determines (specifies) the moving speeds of the moving buttons by referring to a table as shown in FIG. 14 using the corresponding numbers of pressed times.

For example, according to the count table 35 of FIG. 10 and the relationship between the number of pressed times and the speed information shown in FIG. 14, the moving speed of the moving "Copy" button 101 (pressed 123 times) is determined to be "slow"; the moving speed of the moving "DocumentBox" button 102 (pressed 2 times) is determined to be "fast"; and the moving speed of the moving "SEND" button 103 (pressed 7 times) is determined to be "medium".

After determining (specifying) the speed information, the screen control section 10 determines the positions of the moving buttons (step S101). More specifically, the screen control section 10 calculates the positional information (positions) of the moving buttons every predetermined time cycle. Then, the screen control section 10 generates the screen information indicating that the moving buttons are formed on the positions in accordance with the calculated positional information.

Based on the generated screen information, the operation display section 9 displays the screen on the liquid crystal display section 12 (step S102).

FIG. 16A is an example of the screen displayed on the liquid crystal display section 12. More specifically, FIG. 16A shows three moving buttons displayed right after the screen is displayed (Namely, FIG. 16A shows the positions of those moving buttons in the initial condition). Further, the length of the arrows of the moving buttons in FIG. 16A schematically represents the moving speed of the moving buttons. The arrows are not actually displayed in the screen on the liquid crystal display section 12. The longer the length of the arrow of the moving button is, the faster the moving button moves. Therefore, in the example of FIG. 16A, the following inequality is satisfied.

Moving speed of moving "Copy" button 101<Moving speed of moving "SEND" button 103<Moving speed of moving "DocumentBox" button 102

(i.e., Moving speed increases in this order)

Because of the difference of the moving speed, whenever the time cycle has passed (whenever the process passes step S101), the moving "DocumentBox" button 102 moves further in the left direction than the moving "SEND" button 103 and the moving "Copy" button 101 move.

FIG. 16B is an example of the screen displayed on the liquid crystal display section 12. More specifically, FIG. 16B shows the screen including the three moving buttons after a certain time period has passed since the timing of the screen in FIG. 16A. Because of this time difference, the header (left end) position of the moving "DocumentBox" button 102 in the lateral direction is approaching that of the moving "Copy" button 101.

According to this third example, the moving speed of the moving button can be increased or decreased depending on the frequency of selecting (using) the moving button. Because of this feature, it may become possible to improve the usability of the image forming apparatus 100 for the disabled.

Further, the technical feature of this third example may be combined with that of the second example. Namely, for example, the moving button that has been frequently used may be arranged to move more slowly and to have a larger size.

FOURTH EXAMPLE

In this fourth example, an image forming apparatus 100 is described in which the color of the moving button can be changed depending on the frequency of use of the moving button. Namely, by using a more eye-catching color for the moving button having been frequently used, it may become possible to find the moving button having been frequently used more easily. As a result, it may become possible to improve the usability of the image forming apparatus 100.

Further, the functional block diagram and the counter table used in this example are the same as those used in the above second example; therefore their repeated description is omitted.

FIG. 17 is an example of a table stored in the screen control section 10, and the table includes the information regarding the relationship between the number of pressed times and the corresponding colors of the moving button (color information). This example of FIG. 17 shows that the number of pressed times in a range from 0 to 5 corresponds to a "gray" color; the number of pressed times in a range from 6 to 10 corresponds to a "black" color; and the number of pressed times equal to or more than 11 corresponds to a "red" color. In this example, the color information is classified into three colors. However, for example, more than three colors may be used. Further, the ranges of the number of pressed times described in FIG. 17 are one example only.

In this fourth example, the display data same as those used in the above second example may be used. In this fourth example, the screen control section 10 reflects the color information specified in FIG. 17 on at least one of the frame shape information and the character information. More specifically, when the specified color information is gray, the screen control section 10 sets the pixel values of the pixels of at least one of the frame shape information and the character information as (R, G, B)=(128, 128, 128). When the specified color information is black, the screen control section 10 sets the pixel values of the pixels of at least one of the frame shape information and the character information as (R, G, B)=(0, 0, 0). When the specified color information is red, the screen control section 10 sets the pixel values of the pixels of at least one of the frame shape information and the character information as (R, G, B)=(255, 0, 0).

Figure 18:
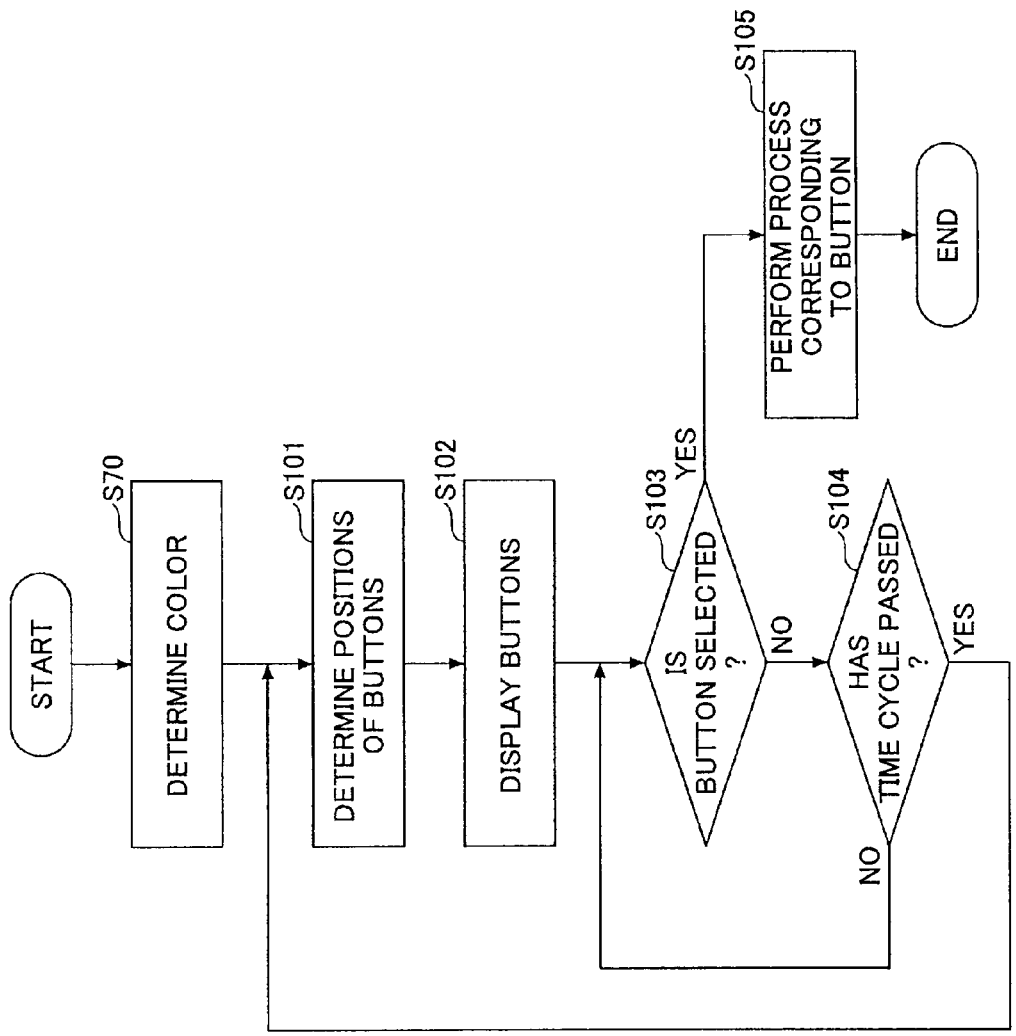
FIG. 18 is an exemplary flowchart showing a case where a moving button is moved and a pressed moving button is specified in the image forming apparatus (fourth example)

FIG. 18 is an exemplary flowchart showing a process of moving the moving buttons and specifying the pressed moving button in the image forming apparatus 100. In FIG. 18, the same step numbers are used for the same steps as those in FIG. 8.

First, the screen control section 10 reads the number of pressed times from the count table 35, the number of pressed times having been counted in the past for each moving button included in the screen to be displayed. Then, the screen control section 10 determines the colors of the respective moving buttons (step S70). Namely, the screen control section 10 determines (specifies) the colors of the respective moving buttons by referring to a table as shown in FIG. 17 using the corresponding numbers of pressed times.

For example, according to the count table 35 of FIG. 10 and the relationship between the number of pressed times and the color information (color) shown in FIG. 17, the color information of the moving "Copy" button 101 (pressed 123 times) is determined to be "red"; the color information of the moving "DocumentBox" button 102 (pressed 2 times) is determined to be "gray"; and the color information of the moving "SEND" button 103 (pressed 7 times) is determined to be "black".

After determining (specifying) the color information, the screen control section 10 determines the positions of the moving buttons (step S101). More specifically, the screen control section 10 calculates the positional information (positions) of the moving buttons every predetermined time cycle. Then, the screen control section 10 generates the screen information indicating that the moving buttons are formed on the positions in accordance with the calculated positional information using the pixel values of the respective specified colors.

Based on the generated screen information, the operation display section 9 displays the screen on the liquid crystal display section 12 (step S102).

Figure 19:
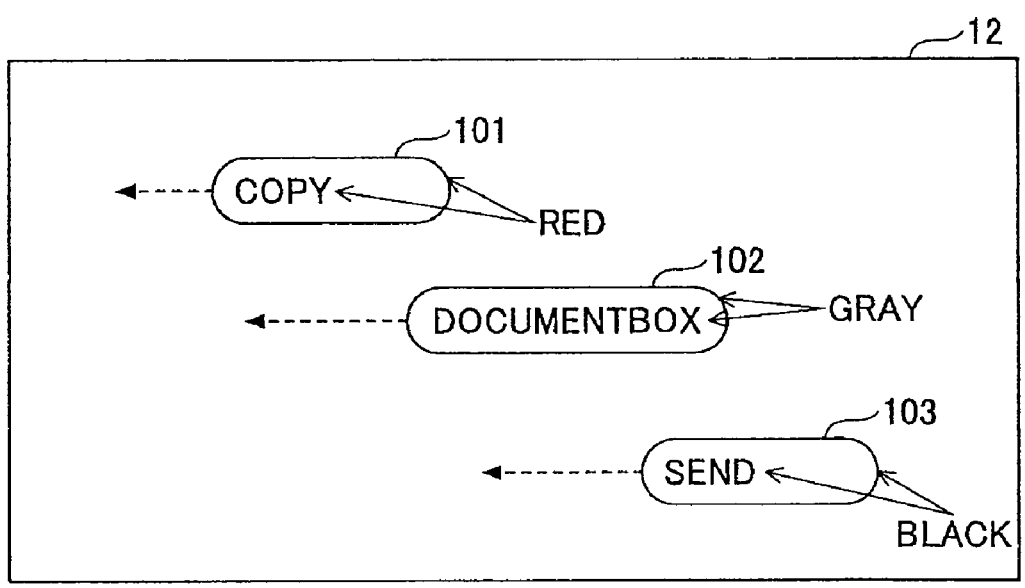
FIG. 19 is a drawing showing an example of a screen displayed on the liquid crystal display section.

FIG. 19 is an example of the screen displayed on the liquid crystal display section 12. More specifically, FIG. 19 shows that the moving "Copy" button 101 is displayed in red; the moving "DocumentBox" button 102 is displayed in gray; and the moving "SEND" button 103 is displayed in black. In this case, the moving button having been used less frequency is displayed in achromatic color and the moving button having been used more frequency is displayed in chromatic color. Because of using different colors as described above, it may become easier to visually recognize and press the moving button having been used frequently.

According to this fourth example, it may become easier to find the moving button that is thought to be pressed more frequently in the feature. Because of this feature, it may become possible to improve the usability of the image forming apparatus 100 for the disabled.

Further, the technical feature of this fourth example may be combined with at least one of the technical features of the second and the third examples. When those technical features of the second, the third, and the fourth examples are combined, the moving button that has been frequently used is arranged to move more slowly, have a larger size and display in red color.

FIFTH EXAMPLE

In this fifth example, an image forming apparatus 100 is described in which the moving button can be selected by using the ten keys 13 as well. When the disabled presses the moving button, it may be required to synchronize the operations of his/her hand with the movement of the moving button. However, the ten keys 13 would not move (change) their positions on the operation display section 9. Therefore, when the ten keys 13 can be used, it may become possible to reduce error in operation and improve the usability of the image forming apparatus 100 for the disabled.

Figure 20:
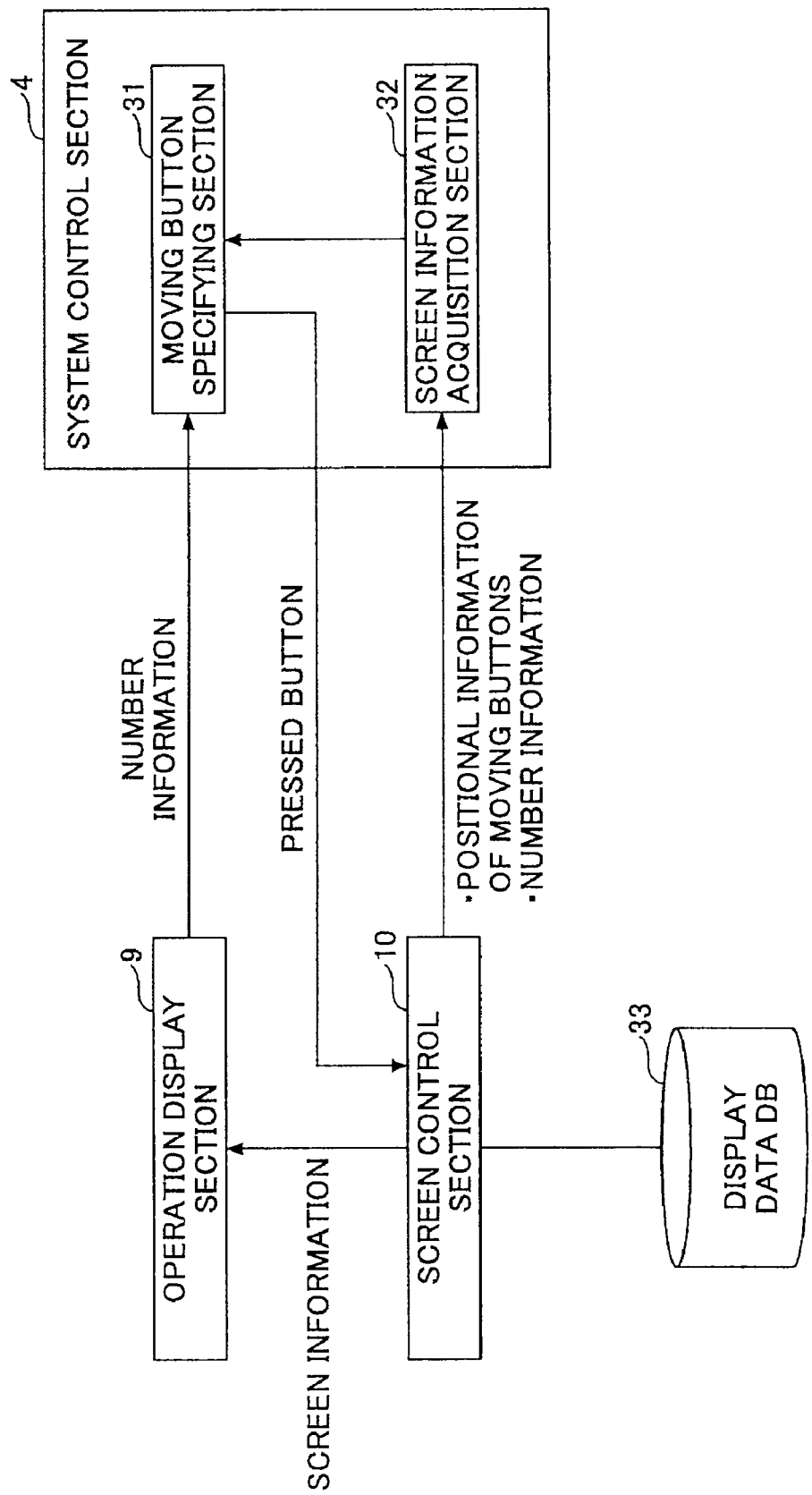
FIG. 20 is an exemplary functional block diagram of an image forming apparatus according to a fifth example of the first embodiment of the present invention.

FIG. 20 shows an exemplary functional block diagram of the image forming apparatus 100 according to this fifth example. The same reference numerals are used in FIG. 20 for the same or equivalent elements in FIG. 6, and the description thereof is omitted. As shown in FIG. 20, in the image forming apparatus 100 according to this fifth example, the operation display section 9 transmits number information to the moving button specifying section 31, the number information indicating the number input via the ten keys 13. Herein, the number information indicates which (0-9, #, *) of the ten keys 13 is pressed.

Figure 23:
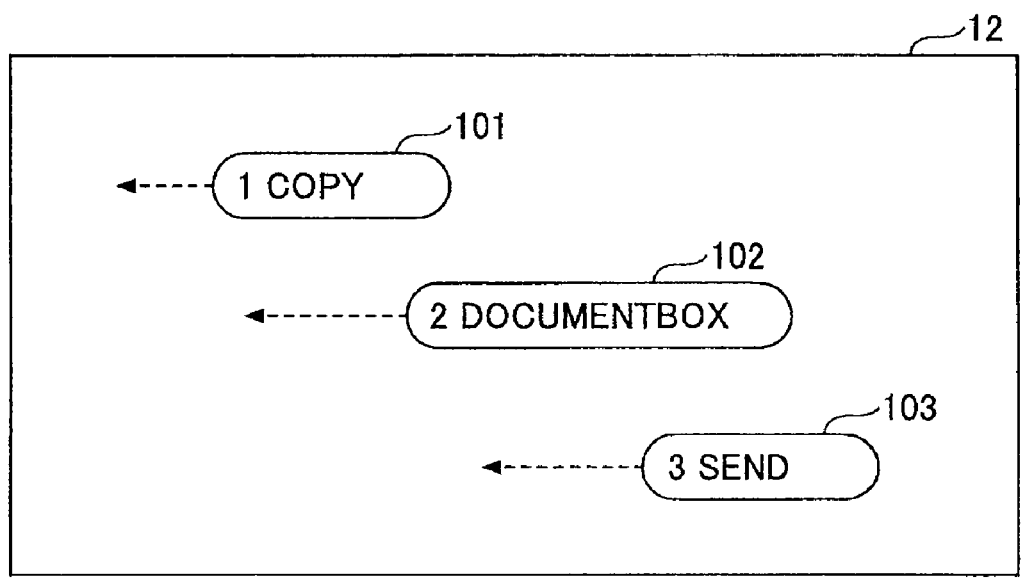
FIG. 23 is a drawing showing an example of a screen displayed on the liquid crystal display section.

Further, in this example, the screen control section 10 controls displaying the moving button with the number (FIG. 23). To that end, the display data include the number information.

FIG. 21 shows an example of display data. In FIG. 21, the same terms and symbols are used for the same or equivalent terms and symbols in FIG. 7, and their description is omitted. As shown in FIG. 21, the display data include the number information associated with the corresponding moving buttons. The screen control section 10 transmits the number information associated with the corresponding moving buttons to the screen information acquisition section 32 of the system control section 4. The moving button specifying section 31 specifies the setting item (moving button) having been selected by the disabled based on the number information and the function of the moving button which are acquired from the screen control section 10 and also based on the number information acquired from the operation display section 9.

Further, when generating the shape of the moving button, the screen control section 10 arranges (places) the number information at the header portion of the character information so as to be displayed as "1 Copy", "2 DocumentBox", and "3 SEND" as shown in FIG. 21. Therefore, the moving buttons displayed on the liquid crystal display section 12 have their corresponding numbers. As a result, the disabled may more easily understand which of the ten keys 13 is to be pressed to select the desired moving button.

Figure 22:
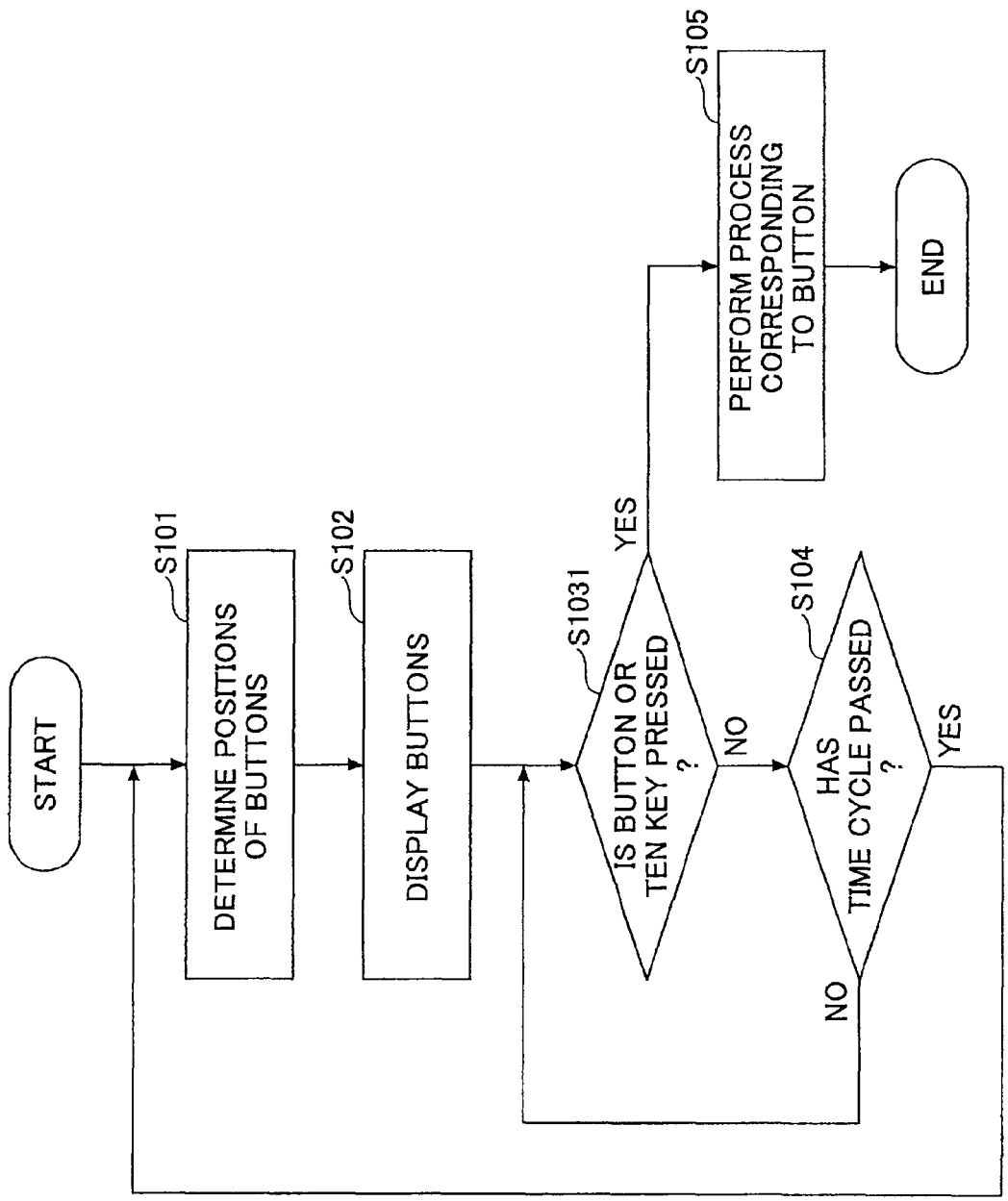
FIG. 22 is an exemplary flowchart showing a case where a moving button is moved and a pressed moving button is specified in the image forming apparatus (fifth example)

FIG. 22 is an exemplary flowchart showing a process of moving the moving buttons and the specifying the pressed moving button in the image forming apparatus 100.

The process of the flowchart in FIG. 22 starts when, for example, the image forming apparatus 100 is operated to display the screen for the disabled.

The screen control section 10 determines the positions of the moving buttons (step S101). More specifically, in this step, the screen information acquisition section 32 of the system control section 4 acquires the positional information of the moving buttons calculated every predetermined time cycle by the screen control section 10. Further, the screen control section 10 transmits the screen information to the operation display section 9, the screen information including the number information to be displayed at the header of the character information of the corresponding moving buttons.

Based on the received screen information, the operation display section 9 displays the screen on the liquid crystal display section 12 (step S102).

FIG. 23 shows an example of the screen displayed on the liquid crystal display section 12. As shown in FIG. 23, the numbers derived from the number information are arranged (displayed) in the respective moving buttons.

Referring back to FIG. 22, the operation display section 9 determines whether the any of the ten keys 13 or the touch panel is pressed by the disabled (step S1031). When determining that the neither the ten keys 13 nor the touch panel is pressed (NO in step S1031), it is assumed that the disabled is still waiting for the display of the desired moving button or is in a selecting (pressing) operation. In this case (NO in step S1031), the screen control section 10 determines whether the predetermined time cycle has passed (step S104). When determining that the predetermined time cycle has not passed (NO in step S104), the process goes back to step S1031, where the operation display section 9 continues (repeats) to determine whether any of the ten keys 13 or the touch panel is pressed.

When operation display section 9 detects no pressing operation to the moving button or the ten keys and the predetermined time cycle has passed (YES in step S104), the process goes back to step S101, so that the screen control section 10 repeats the process from step S101. Namely, the screen control section 10 calculates the positions of the moving buttons again.

On the other hand, in step S1031, when the pressing any of the ten keys 13 or the touch panel is detected (YES in Step S1031), the moving button specifying section 31 of the system control section 4 specifies the pressed (selected) moving button based on, for example, the number information of the moving buttons and the number information specified by the pressing operation of the ten keys 13. When the pressed moving button is specified, the system control section 4 performs the process (function) corresponding to the pressed moving button (step S105).

According to this example, the ten keys in addition to the touch panel are used to select the desired moving button. Because of allowing the disabled to use the ten keys 13 in addition to the touch panel, it may become possible to reduce error in operation and improve the usability of the image forming apparatus 100 for the disabled.

Further, the technical feature of this fifth example may be combined with at least one of the technical features of the second, the third, and the fourth examples.

SIXTH EXAMPLE

In the above examples, the screens for the disabled and the screens for the able-bodied person can be switched by operating (switching) the image forming apparatus 100 by, for example, the able-bodied person. In this sixth example, however, the image forming apparatus 100 automatically displaying the screen for the disabled when the disabled attempts to use the image forming apparatus 100 is described.

Figure 24:
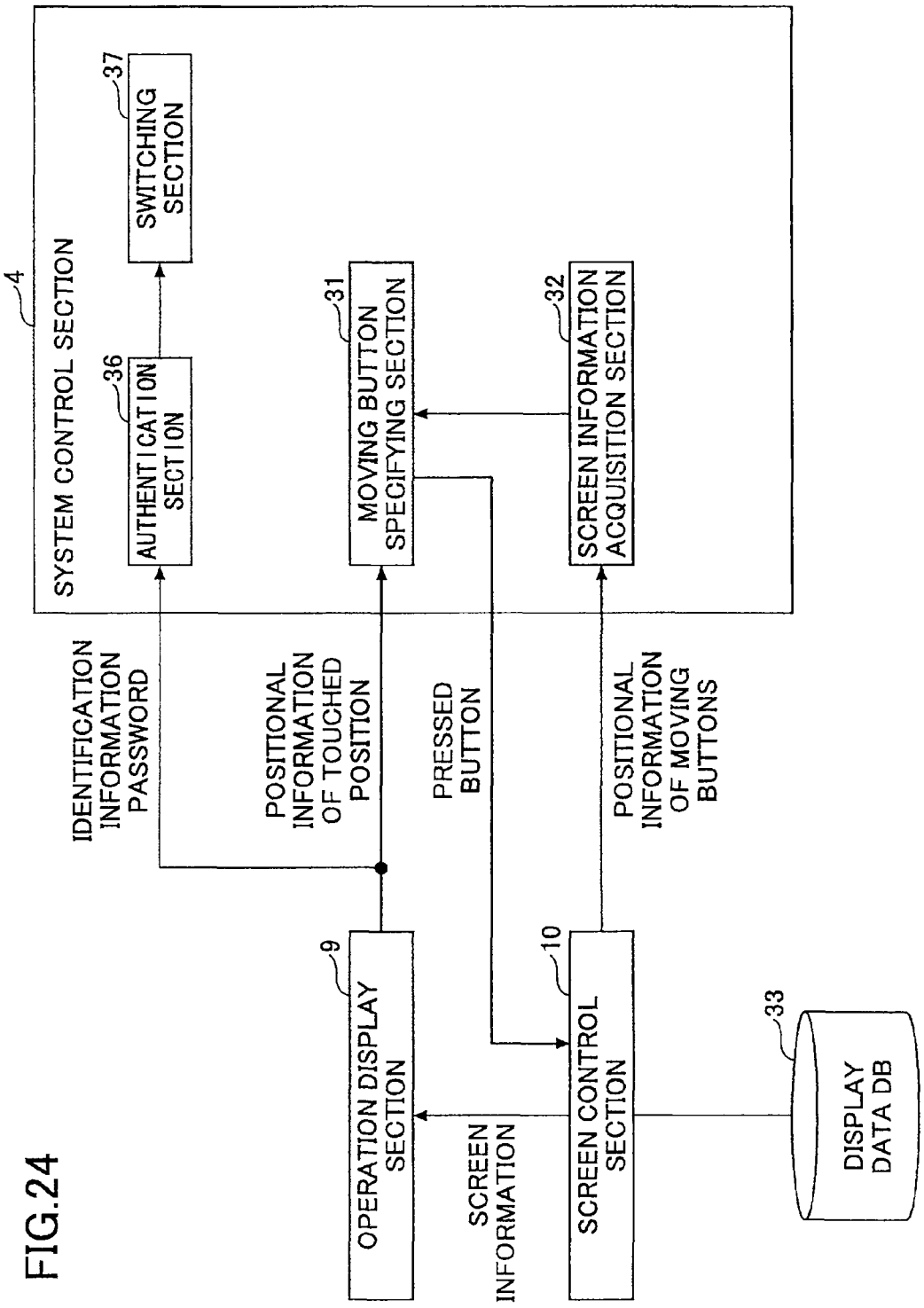
FIG. 24 is an exemplary functional block diagram of an image forming apparatus according to a sixth example of the first embodiment of the present invention.

FIG. 24 shows an exemplary functional block diagram of the image forming apparatus 100 according to this sixth example. The same reference numerals are used in FIG. 24 for the same or equivalent elements in FIG. 6, and the description thereof is omitted. As shown in FIG. 24, in the image forming apparatus 100 according to this sixth example, the system control section 4 further includes an authentication section 36 and a switching section 37. The authentication section 36 previously stores disabled information. The disabled information is associated with user identification information of the users, and therefore is the information indicating whether each of the users is a disabled or an able-bodied person. To authenticate (identify) the user, the user inputs his/her identification information (typically a user name) and password. Otherwise, an IC card may be used. In this case, for example, the user may hold the IC card over the IC card reader (not shown) connected to the image forming apparatus 100.

The authentication section 36 determines whether there is consistency between the identification information and the password input by the user. When determining that there is consistency between the identification information and the password, the authentication section 36 further determines whether the user is a disable or an able-bodied person based on the disabled information. Then, the authentication section 36 transmits the determination result to the switching section 37. Based on the determination result, the switching section 37 switches (displays) the screen for either the disabled or the screen for an able-bodied person.

By doing in this way, only when the user is disabled having difficulty moving his/her hands, the screen for the disabled (i.e., the screen in which the moving buttons are provided) is displayed. As a result, it may become possible to properly switch the screen depending on whether the user is a disabled or an able-bodied person, thereby enabling improving the usability of the image forming apparatus 100 for the users.

Figure 25:
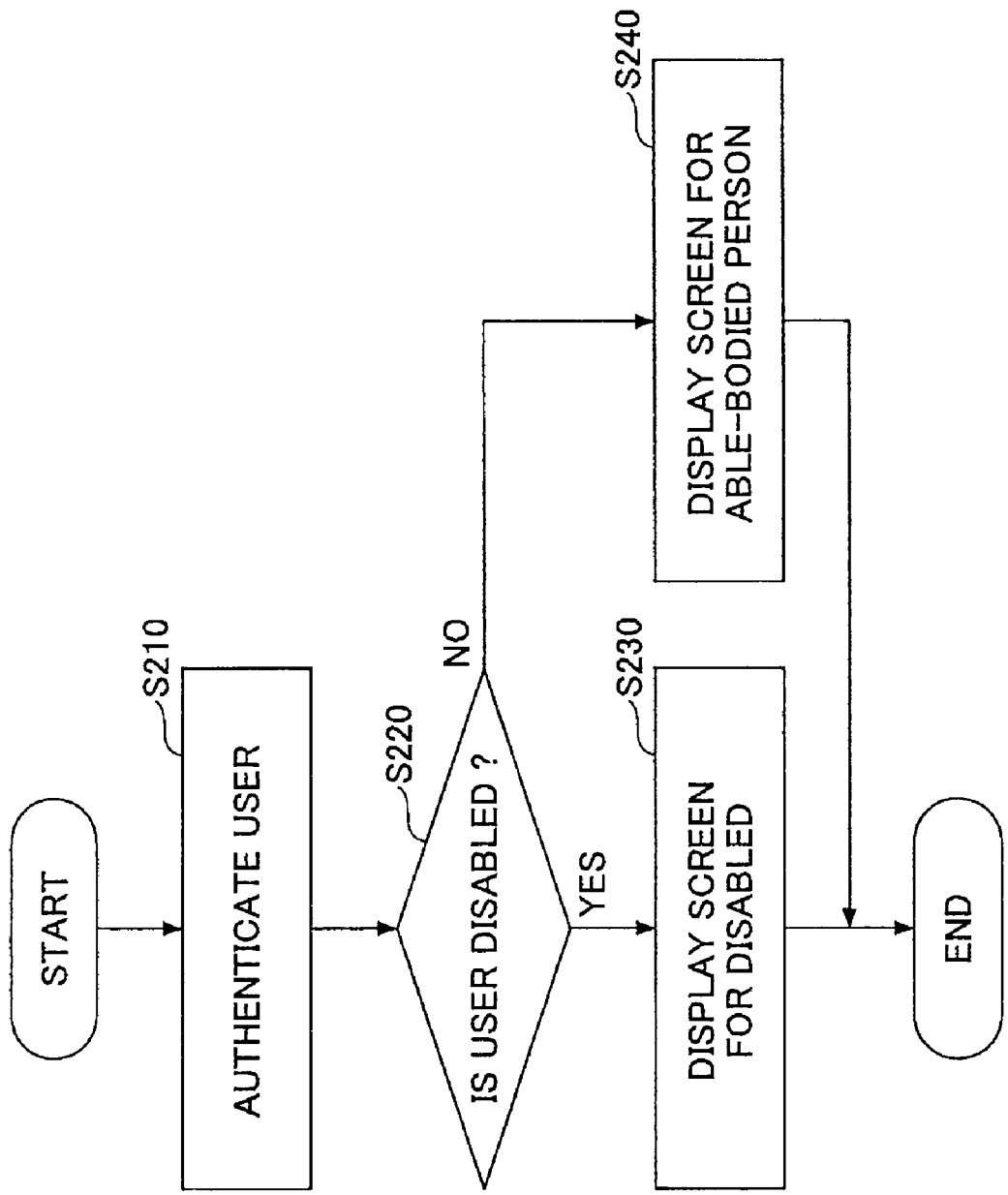
FIG. 25 is an exemplary flowchart showing a case where a moving button is moved and a pressed moving button is specified in the image forming apparatus (sixth example)

FIG. 25 is an exemplary flowchart showing a process of switching the screen depending on whether the user is a disabled or an able-bodied person in the image forming apparatus 100. The process shown in FIG. 25 is applied when, for example, a user starts operating the image forming apparatus 100.

In this case, first, the user operates the operation display section 9 to input his/her identification information and password. Based on the identification information and the password, the authentication section 36 determines whether the user is authenticated. When determining that the user is authenticated, the authentication section 36 specifies (identifies) the user (step S210).

Based on the specification result of the user, the authentication section 36 refers to the disabled information and determines whether the user is an able-bodied person or a disabled person (step S220).

When determining that the user is an able-bodied person (NO in step S220), the system control section 4 causes the screen control section 10 to display the screens for an able-bodied person (step S240). On the other hand, when determining that the user is disabled (YES in step S220), the system control section 4 causes the screen control section 10 to display the screens for the disabled (step S230).

According to this sixth example, an appropriate screen may be automatically displayed depending on whether the user is a disabled or an able-bodied person. By having this feature, it may become possible to improve the usability of the image forming apparatus 100 for the disabled and an able-bodied person. Further, this technical feature of this sixth example may be combined at least one of the technical features of the first through the fifth examples.

Second Embodiment

SEVENTH EXAMPLE

In the following, a seventh example of a second embodiment of the present invention is described. In the seventh example, a selection frame 51 is moved step by step through plural regions of the liquid crystal display section 12 (FIG. 34).

Figure 26:
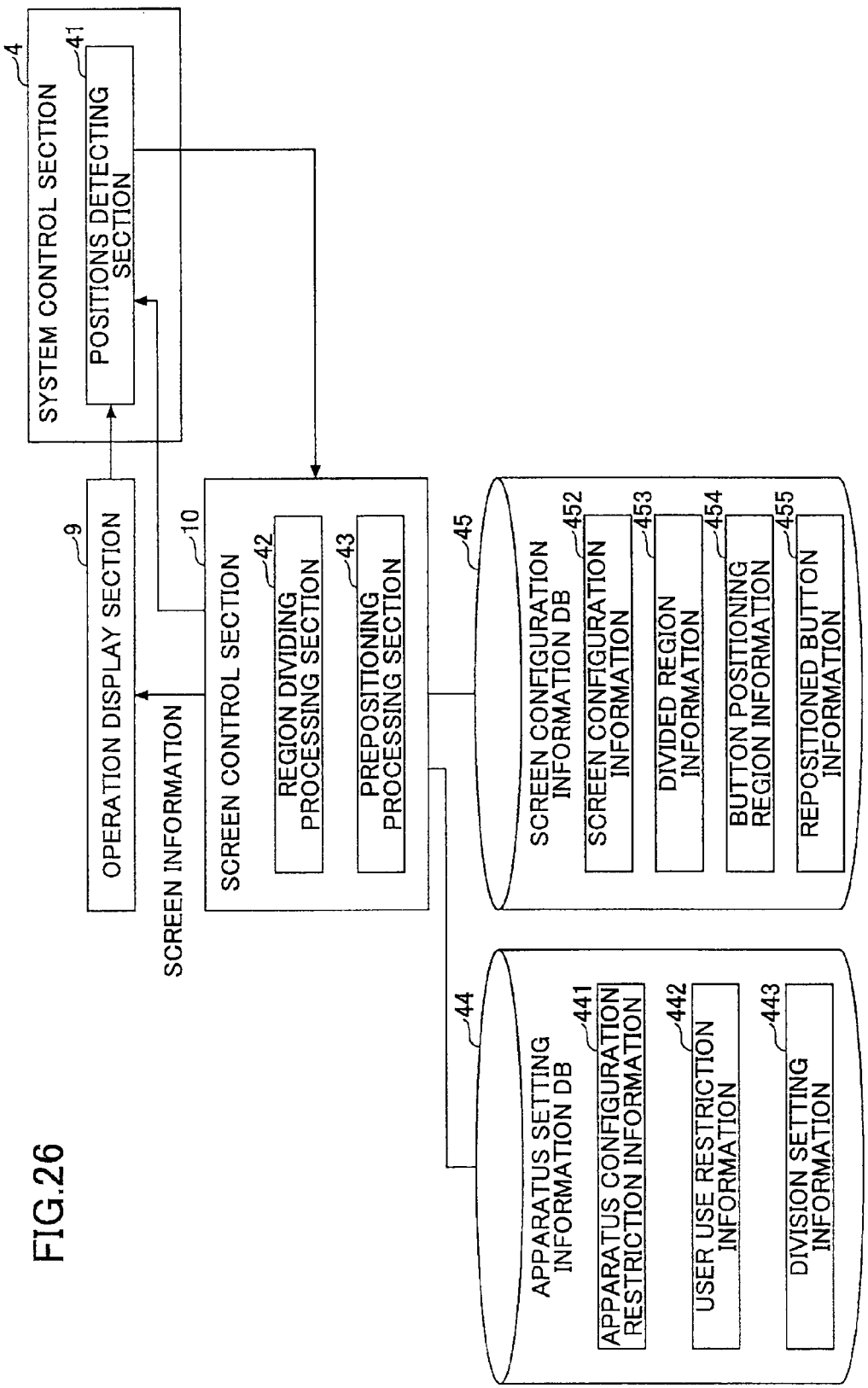
FIG. 26 is an exemplary functional block diagram of an image forming apparatus according to a seventh example of a second embodiment of the present invention.

FIG. 26 shows an exemplary functional block diagram of the image forming apparatus 100 according to this seventh example. The same reference numerals are used in FIG. 26 for the same or equivalent elements in FIG. 6, and the description thereof is omitted. As shown in FIG. 26, the image forming apparatus 100 according to this sixth example includes the operation display section 9, the screen control section 10, and a position detecting section 41. The screen control section 10 includes a region dividing processing section 42 and a repositioning processing section 43. Further, the screen control section 10 is in connection with an apparatus setting information DB (Data Base) 44 and a screen configuration information DB 45.

Similar to the first embodiment described above, the operation display section 9 includes the liquid crystal display section 12 to display various screens. In this example, the screen control section 10 performs screen control to display various screens including a screen in which the selection frame 51 moves. The details of the selection frame 51 are described below.

The apparatus setting information DB (Database) 44 and the screen configuration information DB 45 are stored into a flash memory, a RAM or the like. As shown in FIG. 26, the screen configuration information DB 45 includes (stores) screen configuration information 452, divided region information 453, button positioning region information 454, and repositioned button information 455. On the other hand, the apparatus setting information DB 44 includes (stores) apparatus configuration restriction information 441, user use restriction information 442, and division setting information 443.

The region dividing processing section 42 reads the division setting information 443 from the apparatus setting information DB 44. Then, for example, the region dividing processing section 42 determines the coordinates of the divided regions to divide the screen.

Figure 35A:
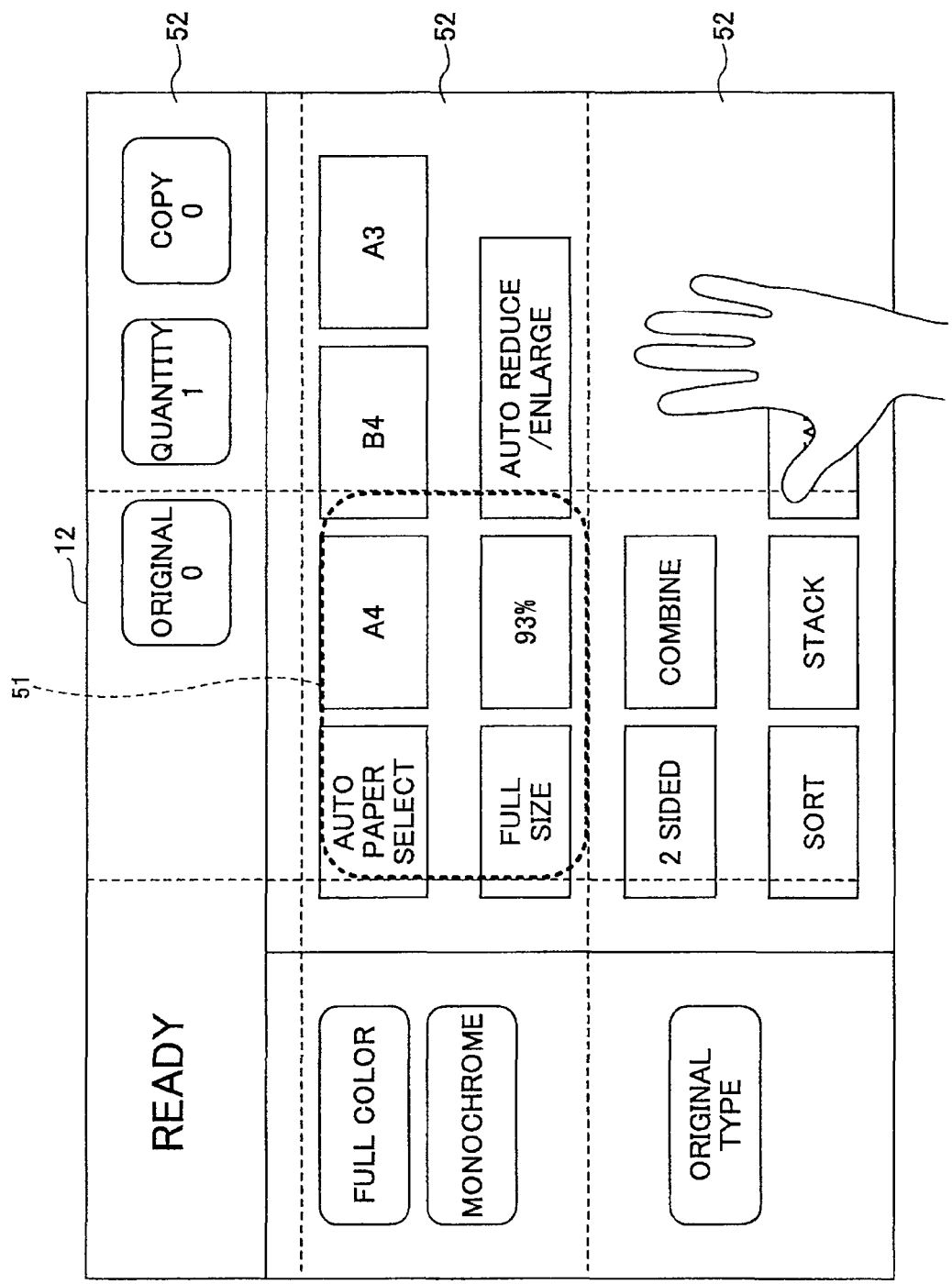
FIGS. 35A and 35B are drawings showing an example of screen transition when any part of the touch panel is pressed by the disabled.
Figure 35B:
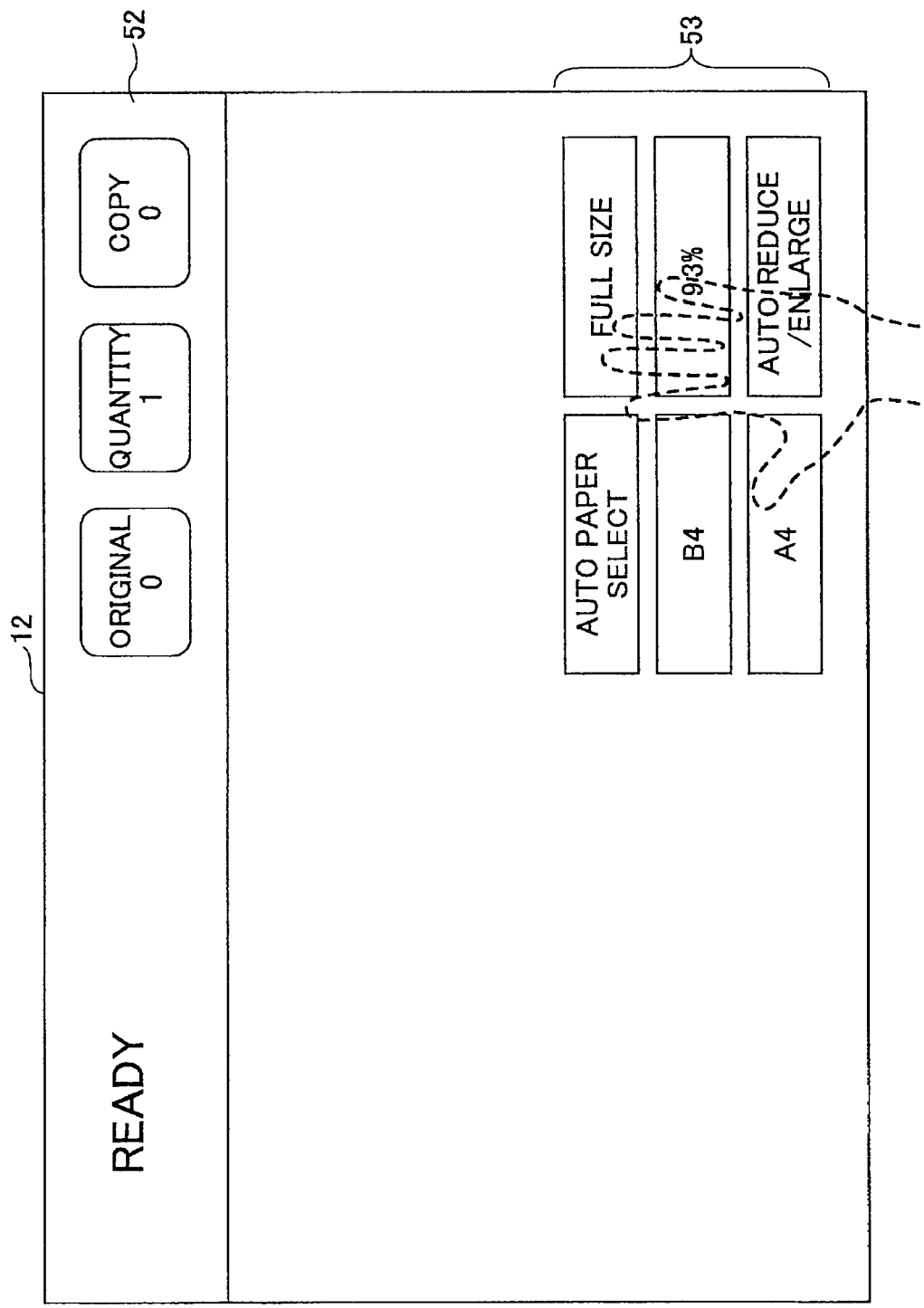

On the other hand, the repositioning processing section 43 acquires the information from the position detecting section 41, the information indicating whether the hand of the user is touched (placed on the touch panel). Then, the repositioning processing section 43 further acquires button IDs of the buttons displayed in the selection frame 51. Then, the repositioning processing section 43 updates (changes) the positions (coordinate values) of the buttons, so that the buttons displayed in the selection frame 51 are repositioned and displayed in a position (region) where the hand is touched (placed) (FIGS. 35A and 35B).

The position detecting section 41 monitors (determines) whether the hand is touched (placed) on the touch panel of the liquid crystal display section 12. When determining (detecting) that the hand is touched, the position detecting section 41 acquires the position (coordinate position) information from the operation display section 9. In this case, from the screen control section 10, the position detecting section 41 further acquires a Divided region ID of a divided region 52 where the selection frame 51 is positioned (located) when the hand is touched to he touch panel.

FIG. 27 is an example of the setting screen where a user sets dividing conditions of the screen (screen dividing conditions). This setting may be called "disabled mode display setting". This setting screen is displayed when, for example, an able-bodied person performs a predetermined operation on the image forming apparatus 100. Also, to display this setting screen, the disabled may perform a predetermined operation on the image forming apparatus 100. In this setting screen for setting the screen dividing conditions, a user sets the screen dividing conditions by setting in a "Division/No Division" setting field 201 (determining whether the screen is to be divided), a "function" setting field 202, a "button No" setting field 203, and a "divided No" setting field 204.

To divide the screen into plural regions (i.e., to activate the technical feature of this seventh example), it is required to select "Divided" in the "Division/No Division" setting field 201. When "No division" is selected in this setting field, the screen is not divided into regions. By selecting "Divided" in this field, the "disabled mode" is set (activated).

In the "function" setting field 202, a user can determine whether the screens are to be divided for each of the functions of the image forming apparatus 100 such as "Copy", "DocumentBox", "SEND", "PRINTER", "Scanner" and the like. When a user selects "each function" in this field, the user can set (display) the divided regions 52 in each setting screen of the functions. In this case, the setting screens of the respective functions are separately displayed (not shown).

In the "button No" setting field 203, a user can set the number of buttons to be displayed in each single region. In this case, for example, a user may input a number using the ten keys 13 (1-9). Based on the number set by the user in this setting field, the region dividing processing section 42 divides the screen into regions in a manner such that the regions include the same number of buttons as set in the corresponding setting fields. In some cases, the number of buttons may not be evenly divided by the number of regions. In such cases, in some of the regions, the number of the buttons is less than the number set in this setting field. For example, a number "3" is set, the region dividing processing section 42 divides the screen into regions so that each region includes three (3) or less (typically 2) buttons.

In the "divided No" setting field 204, a user can set a desired number of the regions in a screen by selecting one of the provided choices. For example, the choices include "3 (vertical) by 3 (lateral)" and "1 (vertical) by 2 (lateral)". In this case, when, for example, "3 by 3" is selected in this setting field, the screen is divided into nine regions in a manner such that there are three regions in the vertical direction and there are also three regions in the lateral direction (FIG. 33).

In this setting screen for the screen dividing conditions, when a user sets the "button No" setting field 203, the setting of the "divided No" setting field 204 become invalid, and vice versa.

When a user finishes the setting in this setting screen and presses the OK button 205 in the setting screen, the setting conditions set in the setting screen (screen dividing conditions) are stored in the apparatus setting information DB 44 as the division setting information 443.

FIG. 28A shows an example of the division setting information 443. FIG. 28A shows a case where screen dividing conditions are set not based on the "button No" but based on the "divided No". As shown in FIG. 28A, the division setting information 443 includes the items "dividing condition" in addition to the "Divided No" and the "button No". In the case of FIG. 28A, data "Area", "9", and "-(none)" are stored as the data of the "dividing condition", "Divided No" and "button No", respectively; and which means that the regions of the screen are determined based on the calculation that the "Area" of the screen is divided by "9".

As described above, in addition to the division setting information 443, the apparatus setting information DB 44 further includes (stores) the apparatus configuration restriction information 441 and the user use restriction information 442. Based on the apparatus configuration restriction information 441, for example, some buttons are set invalid and are not displayed, the buttons corresponding to devices which are not mounted in the image forming apparatus 100.

FIG. 28B shows an example of the apparatus configuration restriction information 441. As shown in FIG. 28B, the apparatus configuration restriction information 441 includes the items "Device", "Status", and "No display item". This example of FIG. 28B shows that the information indicating that the device "Finisher" is not mounted is stored. Further, "staple/punch" is stored as the data of "No display item" in the same row where "Finisher" and "Not mounted" are stored. This explains that the apparatus configuration restriction information 441 stores the information indicating that the buttons related to the "Staple/punch" are not displayed in the screen when the "Finisher" is "Not mounted". In the same manner, the apparatus configuration restriction information 441 stores the information indicating that the buttons related to the "SADF" are not displayed in the screen when the "ADF" is "Not mounted", and that the buttons related to the "Manual tray" are not displayed in the screen when the "Manual tray" is "Not mounted".

FIG. 28C shows an example of the user use restriction information 442. As shown in FIG. 28C, the user use restriction information 442 includes the items "User name", "Function (Device)", "Application use restriction", and "Use restriction item". By appropriately setting the items, it becomes possible to restrict the use of all or part of the functions of the image forming apparatus 100 for each user. The example of FIG. 28C shows that the user "A" can use the monochrome copy function among all the copy functions; the user "A" can use all the facsimile functions; and the user "A" cannot use any of the scanner functions. The screen control section 10 controls so that the buttons corresponding to the functions that cannot be used based on the settings in those "Application use restriction", and "Use restriction item" items are not displayed in the screens.

When there is a button in the divided regions 52, the button corresponding to the functions that cannot be used based on the apparatus configuration restriction information 441 or based on the use restriction information 442, the region dividing processing section 42 restricts the display of the button. Though the details are described below, the region dividing processing section 42 reports to the screen control section 10 that there is a button corresponding to the functions that cannot be used. In this case, the screen control section 10 controls so as not to display the button. Further, when there is a divided region 52 in which there is no button that can be used (i.e., there is no button displayed therein), the screen control section 10 controls the movement of the selection frame 51 in a manner such that the selection frame 51 skips (does not move onto) the divided region 52.

Next, the screen configuration information 452 for generating the screen information is described.

FIG. 29 shows an example of the screen configuration information 452 stored in the screen configuration information DB 45. As shown in FIG. 29, the screen configuration information 452 includes the items "Button ID", "Setting item", "Function name", and "Coordinates (X,Y)". The item "Button ID" indicates the button to be displayed in a predetermined screen. The item "Setting item" indicates the characters to be displayed in the corresponding button. The item "Function name" indicates the function of the corresponding button. The item "Coordinates (X,Y)" designates the position (e.g. upper left corner position) of the corresponding button.

The screen control section 10 reads out the screen configuration information 452 for each screen to be displayed, forms the characters of the setting item inside the frame of the corresponding button, and places the button at the position designated by the coordinates (X,Y). By performed the above processes on all the button IDs, a screen such as shown in FIG. 3 can be generated and displayed.

Based on the division setting information 443, the region dividing processing section 42 determines the coordinate values of the divided regions 52 divided in the screen. When the coordinate values of the divided regions 52 are determined, the coordinates of the divided regions 52 can be accordingly determined.

FIG. 30 shows an example of the divided region information 453 including the coordinate values of the divided regions 52. As shown in FIG. 30, divided region information 453 includes the items "Divided region ID", "Coordinates (X1, Y1)", and "Coordinates (X2, Y2)". The item "Divided region ID" is the information that is used to uniquely identify the corresponding divided region 52 in at least a certain screen. For example, when a screen is divided into nine divided regions 52, the "Divided region IDs" may be "Part1"

through "Part9". The items "Coordinates (X1, Y1)" and "Coordinates (X2, Y2)" of the Part1 through Part9 represent the coordinates of the respective divided regions 52. For example, the item "Coordinates (X1, Y1)" indicates the coordinate value at the upper left corner, and the item "Coordinates (X2, Y2)" indicates the coordinate value at the lower right corner of the corresponding buttons.

As described above, when the divided region information 453 is obtained (determined), the buttons included in the divided regions 52 can be specified. In this case, the region dividing processing section 42 reads out the coordinates (X, Y) of the buttons from the screen configuration information 452 of FIG. 29, and compares the coordinates (X, Y) in the screen configuration information 452 with the coordinates (X1, Y1) and the coordinates (X2, Y2) in the divided region information 453 of FIG. 30. More specifically, the region dividing processing section 42 determines whether the coordinates (X, Y) position of the button ID is included in a rectangular area (formed) defined by the coordinates (X1, Y1) and the coordinates (X2, Y2) position. When determining that the coordinates (X, Y) of the button ID is included in a rectangular area (divided region 52) defined by the coordinates (X1, Y1) and the coordinates (X2, Y2), the region dividing processing section 42 further determines that the button is included in the divided region 52. Then, the region dividing processing section 42 associates the button ID of the button with the divided region ID of the divided region 52.

FIG. 31 shows an example of the button positioning region information 454 in which the "button IDs" are associated with the corresponding "Divided region IDs". As shown in FIG. 31, the button positioning region information 454 includes the items "Button ID" and "Divided region ID". Namely, the "Divided region ID" associated with the "Button ID" is stored (registered).

Because of this feature, by referring to the button positioning region information 454, the screen control section 10 can determine which button is included in which divided region 52.

Operating Procedure

FIG. 32 is an exemplary flowchart showing the procedure from selecting the "Divided" in the setting screen of the dividing conditions to generating the button positioning region information 454.

First, the screen control section 10 determines whether the "disabled mode" is set (activated) (step S310). As described above, by selecting the "Divided" in the "Division/No Division" setting field 201 of the setting screen (FIG. 27), the "disabled mode" can be set (activated).

When determining that the "disabled mode" is not set (NO in step S310), the screen control section 10 displays a screen for an able-bodied person as shown in FIG. 3 using the screen configuration information 452 of FIG. 29 (step S370). In this case, the user sets the dividing conditions in the setting screen of the dividing conditions. Therefore, the division setting information 443 is stored in the apparatus setting information DB 44.

On the other hand, when determining that the "disabled mode" is set (YES in step S310), the region dividing processing section 42 reads out the division setting information 443 in the apparatus setting information DB 44 (step S320).

Based on the division setting information 443, the region dividing processing section 42 performs a region dividing process to divide the screen (step S330). By performing this process, it becomes possible to determine the coordinate values of the divided regions 52 and generate the divided region information 453 of FIG. 30.

Next, the region dividing processing section 42 determines (specifies) which button having its button ID in the screen configuration information 452 is included in which divided region 52. Based on this determination, the region dividing processing section 42 associates the button IDs with the corresponding Divided region IDs, and generates the button positioning region information 454 (step S340). The button positioning region information 454 is stored in the screen configuration information DB 45.

Then, the region dividing processing section 42 transmits the divided region information 453 and the button positioning region information 454 to the screen control section 10 so that the screen control section 10 can use the information (step S350). To make it possible to use the information, specifically, the region dividing processing section 42 stores the divided region information 453 and the button positioning region information 454 in the screen configuration information DB 45.

The screen control section 10 divides the screen into the divided regions 52 and displays the screen (step S360).

Example of Dividing the Screen

FIG. 33 is an example of a screen displayed by the screen control section 10. FIG. 33 shows a case where the area of the screen is divided into nine divided regions 52. The dotted lines in FIG. 33 are borders of the divided regions 52. However, the dotted lines may not be necessary displayed. This is because, in this embodiment the selection frame 51 sequentially moves through the divided regions 52 (e.g., FIG. 34). Therefore, the disabled may not have to carefully watch the borders of the divided regions 52 during the operation. However, to display the dotted lines to be recognized, the screen control section 10 refers to the divided region information 453, and changes the pixel values of the borders of the divided regions 52 so that the borders are displayed in red, black or the like.

Herein, the term "sequentially move(s)" refers to a moving mode in which the selection frame 51 is superimposed onto one of the divided regions 52 for a predetermined time period (e.g., several seconds) and then, in the next instant, the selection frame 51 is superimposed onto the next divided region 52, and above steps are repeated. However, alternatively, the selection frame 51 may gradually move through the divided regions 52 similar to the moving buttons described in the above first embodiment of the present invention.

Further, the screen control section 10 refers to the divided region information 453, and displays a frame (selection frame 51) having substantially the same size as or a somewhat smaller size than that of the divided regions 52. The selection frame 51 sequentially moves through the divided regions 52. There are two moving modes. In one moving mode, as described above, the selection frame 51 automatically moves to the next (adjoining) divided region 52 every predetermined time period. In the other mode, the movement of the selection frame 51 to the next (adjoining) divided region 52 is triggered when a press input (pressing operation) to the touch panel is detected. These two modes can be switched based on, for example, the operation that a user presses and holds the touch panel for a certain time period and then releases the hold. The details of the switching operation are described below. In this case, the screen control section 10 receives the report from the operation display section 9 that the user has performed the switching operation.

FIG. 34 schematically shows an example of a movement of the selection frame 51. In the example of FIG. 34, the selection frame 51 sequentially moves from the upper left divided region 52 to the upper right divided region 52 (in the upper row), and sequentially moves to the middle right divided region 52. Then, the selection frame 51 sequentially moves from the middle right divided region 52 to the middle left divided region 52 (in the middle row), and sequentially moves to the lower left divided region 52. Then, the selection frame 51 sequentially moves from the lower left divided region 52 to the lower right divided region 52 (in the lower row), and sequentially moves (back) to the original upper left divided region 52.

However, it should be noted that the above-described movement with reference to FIG. 34 is one example only. For example, the selection frame 51 sequentially moves in the order of the center (middle in the middle row) divided region 52, the middle right divided region 52, the lower right divided region 52, the lower middle divided region 52, the lower left divided region 52, the middle left divided region 52, the upper left divided region 52, the upper middle divided region 52, the upper right divided region 52, and the center divided region 52 (i.e., in a spiral pattern). By moving in this way, it may become possible to more rapidly move the selection frame 51 to the divided region 52 including a button that has been frequently pressed.

Button Selection Using the Selection Frame 51

Next, a method is described of selecting a button when the selection frame 51 sequentially (automatically) moves.

FIG. 35A shows an example of selecting a button using the selection frame 51. In this example, as shown in FIG. 35A, the selection frame 51 exists (is superimposed onto) the center (middle in the middle row) divided region 52. While the selection frame 51 exists in this position, when the disabled presses any part of the touch panel, the position detecting section 41 detects that the touch panel is pressed. In the meantime, from the screen control section 10, the position detecting section 41 acquires the Divided region ID of the divided region 52 where the selection frame 51 exists exactly when the touch panel is pressed.

In this example, as schematically shown in FIG. 35A, when the touch panel is pressed, the selection frame 51 exists in the center divided region 52. Therefore, the position detecting section 41 acquires, for example, the "Part 5" as the Divided region ID of the divided region information 453 in FIG. 30. In this method, simply by touching any part of the touch panel, the disabled can specify the divided region 52. In this case, since the disabled can touch any part of the touch panel, it may become possible to improve the usability of the image forming apparatus 100 when compared with a case where the disabled has to press a specified part of the touch panel. Further, in this method, the disabled is allowed to touch any part of the touch panel. However, needless to say, the disabled may touch the exact divided region 52 where the selection frame 51 exists.

Divided Region where the Selection Frame 51 Skips

The screen control section 10 may exclude a button that cannot be selected, so that the button cannot be selected by the disabled. Herein, the term "exclude" refers to not moving the selection frame 51 onto the divided region 52 containing only buttons that cannot be selected, or not repositioning the buttons that cannot be selected in the process of repositioning. The details of repositioning the buttons are described below.

As described above, the region dividing processing section 42 can refer to the configuration restriction information 441 and the user use restriction information 442. Accordingly, based on at least one of the configuration restriction information 441 and the user use restriction information 442, the region dividing processing section 42 specifies the button ID of the button that cannot be selected (pressed). For example, in the configuration restriction information 441 of FIG. 28B, when the "Finisher" is not mounted, the "Staple/punch" is recognized as the "No display item". Therefore, the region dividing processing section 42 reports the button ID of the buttons related to the "Staple" or the "Punch" to the screen control section 10 (so that the buttons related to the "Staple" or the "Punch" cannot be displayed). As the method of this report, for example, a special ID (e.g. 999) may be set to the button ID of the button of the function recognized as "No display item".

The screen control section 10 specifies the Divided region ID associated with only the button IDs of the buttons that cannot be displayed. For example, in the example of FIG. 33, there is only the "Staple" button in the lower right divided region 52. Since the "Staple" button cannot be selected according to the configuration restriction information 441 of FIG. 28B, the screen control section 10 specifies the Divided region ID of the lower right divided region 52. As a result of the specification process, the screen control section 10 controls the movement of the selection frame 51 in a manner such that the selection frame 51 skips (does not move into (stop by)) the lower right divided region 52. Further, whether the selection frame 51 moves into (stops by) the divided region 52 containing only buttons that cannot be selected can be set in the image forming apparatus 100 by a user.

Repositioning the Buttons

FIG. 35B shows an example of a screen when the disabled releases his hand from the touch panel after touching as shown in FIG. 35A. In this case, the position detecting section 41 detects that the disabled releases his hand from the touch panel after the touching. In the meantime, the position detecting section 41 has already acquired the Divided region ID of the divided region 52 where the selection frame 51 exists exactly when the touch panel is pressed. Therefore, the position detecting section 41 reports the acquired Divided region ID to the repositioning processing section 43. In addition, the position detecting section 41 reports the positional information of the position where the disabled touched (pressed) to the repositioning processing section 43.

The repositioning processing section 43 refers to the button positioning region information 454 based on the received Divided region ID, and extracts all the button IDs associated with the Divided region ID in the button positioning region information 454. In the example of FIG. 35B, the button IDs of the buttons "Auto Paper Select", "A4", "Full size", "93%", "B4", and "Auto Reduce/Enlarge" are extracted.

The repositioning processing section 43 refers to the screen configuration information 452 based on the extracted button IDs, and repositions (moves the positions of) the buttons of the extracted button IDs so that the buttons are displayed at or near the position touched by the disabled. In this repositioning process, the repositioning processing section 43 may appropriately reduce or enlarge the sizes of the buttons. By enlarging the size of the buttons, it may become easier for the disabled to press the repositioned button. On the other hand, for example, when the number of the repositioned buttons is large, the sizes of the buttons may be appropriately reduced before the buttons 53 are arranged (displayed).

The screen control section 10 updates the screen based on the screen information generated by the repositioning processing section 43. By doing this, it becomes possible to reposition and display the buttons 53 closer to the hand of the disabled as shown in FIG. 35B. In FIG. 35B, the six buttons "Auto Paper Select", "A4", "Full size", "93%", "B4", and "Auto Reduce/Enlarge" are displayed closer to the hand of the disabled.

FIG. 36 shows an example of the repositioned button information 455 generated by the repositioning processing section 43. As shown in FIG. 36, the repositioned button information 455 includes (stores) the items "Button ID", "Coordinates (X3, Y3)", and "Coordinates (X4, Y4)". The items "Coordinates (X3, Y3)" and "Coordinates (X4, Y4)" are associated with the corresponding "Button ID". For example, the item "Coordinates (X3, Y3)" indicates the coordinate value at the upper left corner, and the item "Coordinates (X4, Y4)" indicates the coordinate value at the lower right corner of the corresponding buttons.

FIG. 37 shows an example of a state transition table indicating the transition of states when the touch panel is pressed in the cases of FIGS. 33 through 35B. The terms used in this table of FIG. 37 are defined herein as follows:

The "State 1" is the state where the selection frame 51 automatically moves to the next (adjoining) divided region 52 every predetermined time period.

The "State 2" is the state where the movement of the selection frame 51 to the next (adjoining) divided region 52 by the screen control section 10 is triggered when a press input (pressing operation) to the touch panel is detected.

The "Normal press" is the pressing operation in which the disabled presses and holds the touch panel and a predetermined time period has not passed yet.

The "Long press" is the pressing operation in which the disabled presses and holds the touch panel and a time period equal to or longer than the predetermined time period has passed.

The "Normal press→Release" is the pressing operation in which the disabled releases his/her hand from the touch panel during the "Normal press" state.

The "Long press→Release" is the pressing operation in which the disabled releases his/her hand from the touch panel during the "Long press" state.

According to the state transition table of FIG. 37, in "State 1", even when any of the operations "Normal press", "Long press", and "Normal press→Release" is performed, the image forming apparatus 100 maintains "State 1". On the other hand, in "State 1", when the "Long press→Release" operation is performed, the image forming apparatus 100 transitions (changes) from "State 1" to "State 2". Further, in "State 2", when any of the operations "Normal press", "Long press", "Normal press→Release", and "Long press→Release" is performed, the image forming apparatus 100 maintains "State 2".

Further, the operations accepted by the image forming apparatus 100 are expressed by using numbers I though IV in the state transition table of FIG. 37. The operations I though IV are herein defined as follows:

I: to acquire information of the divided region 52 where the selection frame 51 exists
II: to move the selection frame 51
III: to reposition
IV: to initialize a timer (the timer is used for measuring the holding time in the pressing and holding operation)

Therefore, in "State 1", when the "Normal press" operation is performed, the position detecting section 41 acquires the Divided region ID of the divided region 52 where the selection frame 51 exists. Similarly, in "State 1", when the "Long press" operation is performed, the position detecting section 41 acquires the Divided region ID of the divided region 52 where the selection frame 51 exists. Further, in "State 1", when the "Normal press→Release" operation is performed, the repositioning processing section 43 repositions the buttons. Further, in "State 1", when the "Long press→Release" operation is performed, the screen control section 10 resets (initializes) the timer.

In "State 2", when the "Normal press" operation is performed, the screen control section 10 moves the selection frame 51. Further, in "State 2", when the "Long press" operation is performed, the position detecting section 41 acquires the Divided region ID of the divided region 52 where the selection frame 51 exists. Further, in "State 2", when the "Normal press→Release" operation is performed, the image forming apparatus 100 performs nothing (does not respond). Further, in "State 2", when the "Long press→Release" operation is performed, the repositioning processing section 43 repositions the buttons.

Operating Procedure

Figure 38:
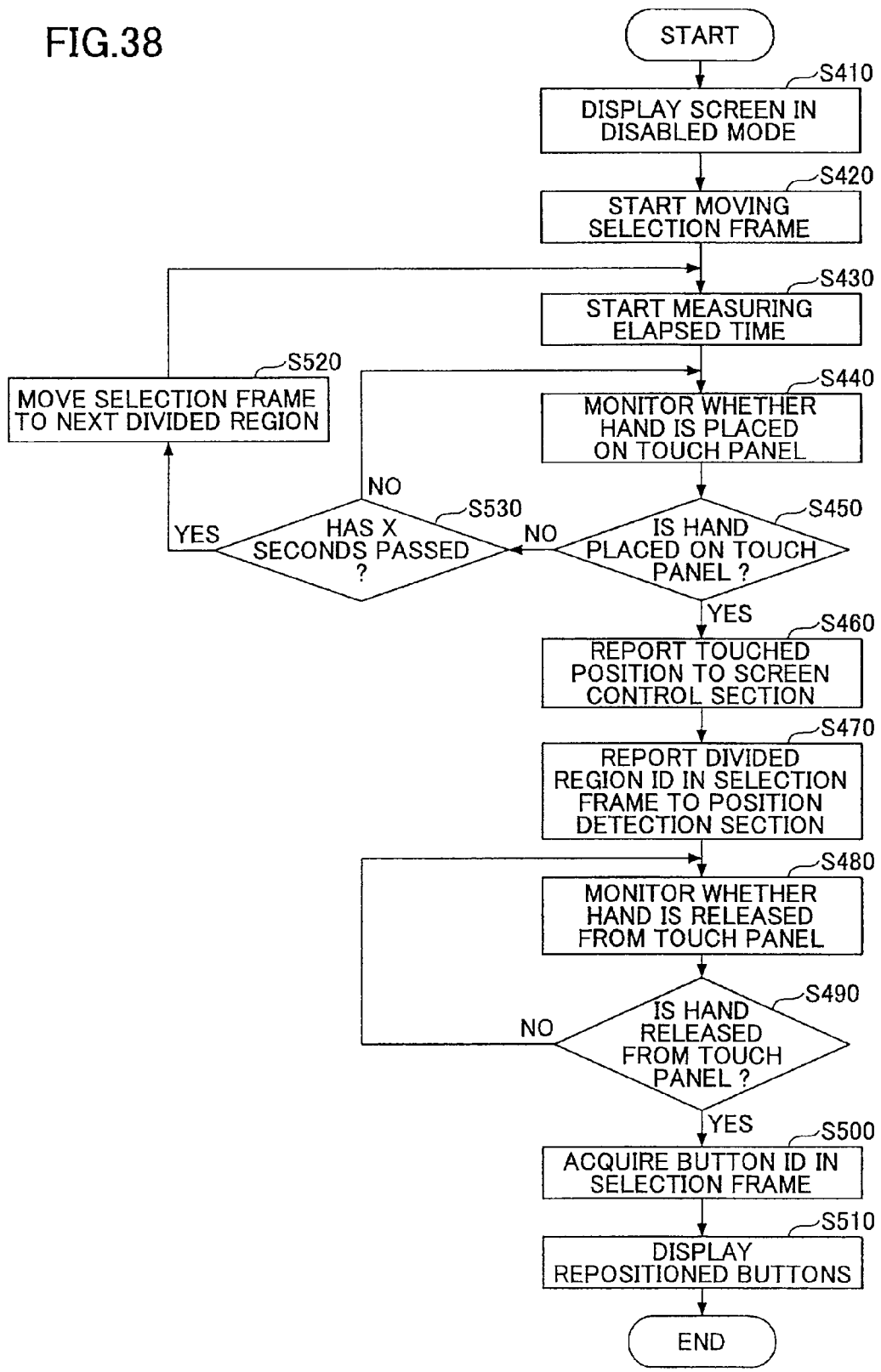
FIG. 38 is an exemplary flowchart showing processes including selecting the selection frame and repositioning of the buttons.

FIG. 38 is an exemplary flowchart showing the procedure including the processes of selecting the selection frame 51 and repositioning the buttons. In this procedure, it is assumed that the procedure starts in "State 1".

First, the screen control section 10 of the image forming apparatus 100 displays the screen in the "disabled mode" in FIG. 33 in response to a predetermined operation performed by a user (step S410).

The screen control section 10 starts moving the selection frame 51 (step S420). In this case, it is assumed that the initial position and the moving direction (method) of the selection frame 51 have been determined already.

The screen control section 10 starts measuring a time period so as to move the selection frame 51 to the next divided region 52 based on every predetermined time period ("x" seconds) (step S430).

While continuing the measurement of the time period, the screen control section 10 monitors whether the report indicating that the disabled touches the touch panel is received from the position detecting section 41 (step S440).

When determining that the position detecting section 41 does not report that the disabled touches the touch panel (NO in step S450), the screen control section 10 determines whether the predetermined time period ("x" seconds) has passed (step S530). When determining that the predetermined time period ("x" seconds) has not passed (NO is step S530), the process goes back to step S440 and the screen control section 10 continues the monitoring.

On the other hand, when determining that the predetermined time period ("x" seconds) has passed (YES in step S530), the screen control section 10 moves the selection frame 51 to the next divided region 52 (step S520). Then, the process goes back to step S430, and the screen control section 10 starts measuring the time period while the selection frame 51 stays in the next divided region 52 (step S430).

Referring back to step S450, when (or before or after) the position detecting section 41 reports that the disabled touches the touch panel to the screen control section 10 (YES in step S450), the position detecting section 41 reports the positional information of the touched position to the screen control section 10 (step S460).

The screen control section 10 refers to the divided region information 453, reads out the Divided region ID of the divided region 52 where the selection frame 51 exists, and reports the Divided region ID to the position detecting section 41 (step S470).

Then, the screen control section 10 monitors whether the disabled releases his/her hand from the touch panel (step S480). Until the disabled releases his/her hand from the touch panel (NO in step S490), the screen control section 10 continues the monitoring.

When the disabled releases his/her hand from the touch panel (YES in step S490), the screen control section 10 refers to the button positioning region information 454, and reads out the button IDs of the buttons included in the divided region 52 where the selection frame 51 exists (step S500).

The screen control section 10 reports the button IDs of the buttons included in the divided region 52 to the repositioning processing section 43.

The repositioning processing section 43 repositions the buttons included (displayed) in the divided region 52 to or near the area of the touch panel touched by the disabled (step S510). In this case, the repositioning processing section 43 refers to the screen configuration information 452, and determines the buttons to be displayed. For example, the repositioning processing section 43 determines (adjusts) the sizes of the buttons depending on the number of buttons to be repositioned, and arranges the buttons near the area touched by the disabled. By executing the procedure as described above the buttons are repositioned as shown in FIG. 35B.

Buttons not Repositioned

As described above, there may be some buttons that cannot be displayed based on the configuration restriction information 441 or the user use restriction information 442. Therefore, there may be case where a part of the buttons in the same divided region 52 cannot be displayed. In other words, in this divided region 52, the buttons that can be selected (displayed) and the buttons that cannot be selected (displayed) are mixed (included) at the same time.

Therefore, in a case where the disabled selects the divided region 52 and there is the button ID of the button that cannot be displayed in the divided region 52 as a result of referring to the button positioning region information 454, the screen control section 10 reports the button IDs of the buttons included in the divided region 52 to the repositioning processing section 43. By doing this, it becomes possible for repositioning processing section 43 not to display the button that cannot be displayed and that corresponds to the button ID.

As described above, since only the buttons that can be selected can be displayed as the choices in the screen, it may become possible to improve the usability of the image forming apparatus 100.

Figure 39:
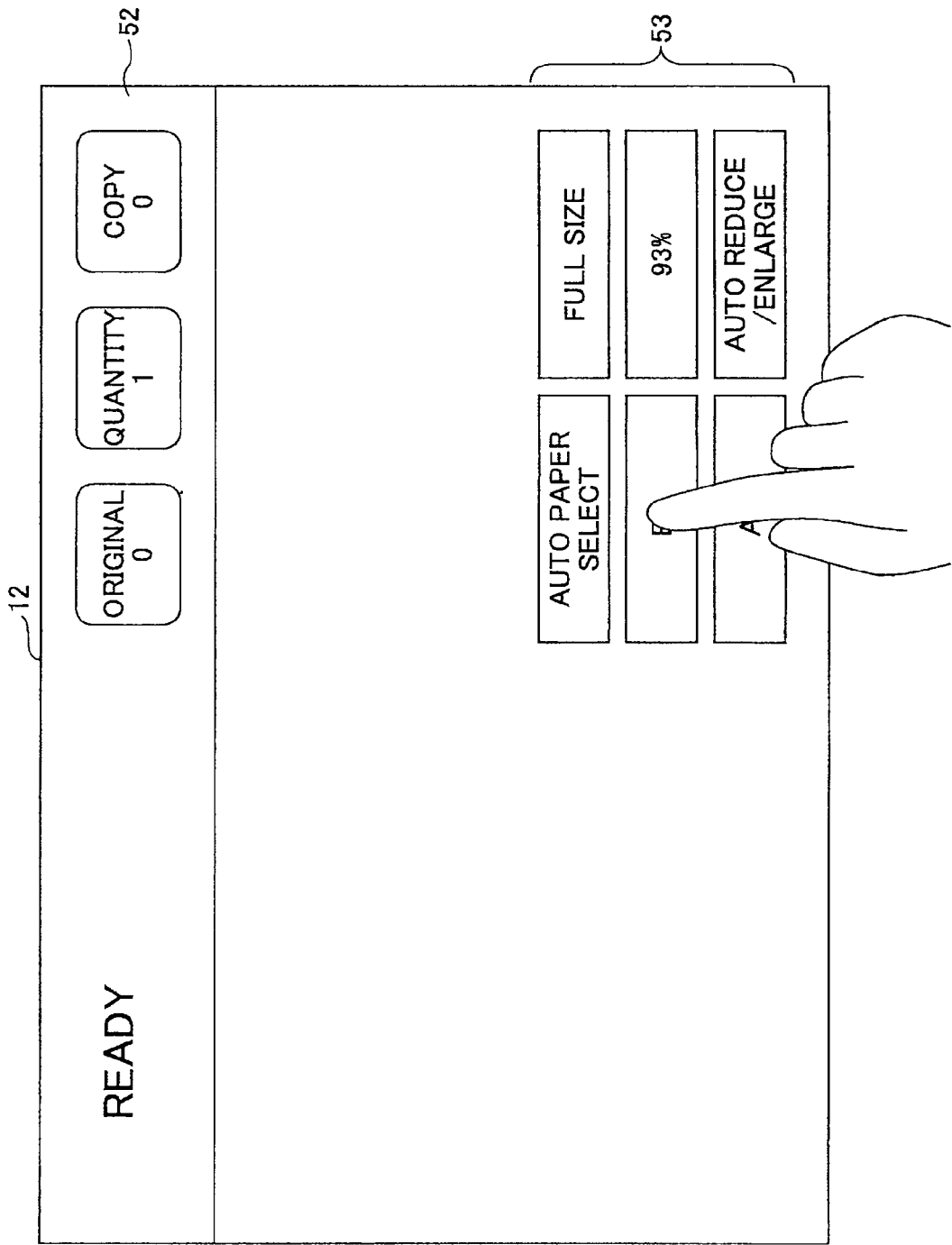
FIG. 39 is a drawing showing a screen on which the disabled selects one of the repositioned buttons displayed on the touch panel.

FIG. 39 shows an example of a screen where the disabled selects one of the repositioned buttons. There are two operating methods where the disabled selects one button from among the repositioned buttons. In one operating method, the disabled selects a desired button as shown in FIG. 39. In this operating method, the system control section 4 specifies the button pressed by the disabled based on a comparison between the positional information indicating the touched position acquired from the position detecting section 41 and the repositioned button information 455 acquired from the repositioning processing section 43.

In the other operating method, there is provided a second selection frame (not shown) formed around each of the buttons (six buttons in the case of FIG. 39); and the second selection frame sequentially moves through the buttons (one by one). Then, while the second selection frame exists on the desired button, the disabled may press any part of the touch panel. In this operating method, as described above, the disabled is allowed to press any part of the touch panel. Therefore, it may become possible to operate in the same way as the disabled selecting the divided region 52 as described above.

These two operating methods may be switched from one to the other by a predetermined operation such as the disabled performing the above "Normal press→Release" operation twice within a predetermined short time period.

As described above, in the image forming apparatus 100 according to an embodiment of the present invention, the disabled may select a group of buttons that includes a desired button and that is included in a divided region 52 by pressing any part of the touch panel while the selection frame 51 exists in the divided region 52. Then, the group of the buttons may be repositioned and displayed near the hand of the disabled. Because of this feature, the disabled may select the desired button without moving his/her hand through a greater distance. Further, when the second selection frame sequentially moves through the selected group of buttons, the disabled may select the desired button simply by continually pressing any (the same) part of the touch panel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus accepting a selecting operation of selecting a button displayed on a touch panel thereof and performing a process corresponding to the selected button, the image forming apparatus comprising:
    a moving region display unit configured to display a region mark to be selected on the touch panel and move the region mark as time passes; and
    a button specifying unit configured to specify one or more of the buttons based on positional information indicating a position of the region mark and positional information indicating a pressed position of the touch panel.

2. The image forming apparatus according to claim 1; further comprising:
    a dividing condition accepting unit configured to accept a dividing condition for dividing the touch panel into plural regions; wherein
    the moving region display unit displays the region mark on the touch panel, the region mark having substantially the same size as that of the regions, in a manner such that the region mark is superimposed onto one of the regions and moves through the regions, and
    the button specifying unit specifies the one or more of the buttons included in the region mark when the touch panel is pressed regardless of the positional information indicating the pressed position of the touch panel.

3. The image forming apparatus according to claim 2; further comprising:
    a repositioning unit configured to reposition the one or more of the buttons specified by the button specifying unit to near the pressed position of the touch panel and display the repositioned one or more of the buttons.

4. The image forming apparatus according to claim 3, wherein
    the repositioning unit refers to device mounting information and user use restriction information, the device mounting information storing button information of an optional part mounted on the image forming apparatus, the user use restriction information storing information regarding one or more of the buttons that can or cannot be used by a user, and then,
    the repositioning unit excludes the buttons corresponding to a not-mounted part based on the device mounting information or the buttons that cannot be used based on the user use restriction information from the buttons to be repositioned to near the pressed position of the touch panel.

5. The image forming apparatus according to claim 2; further comprising:
    a switching unit configured to switch between a mode in which the region mark sequentially moves through the regions as time passes and a mode in which the region mark sequentially moves through the regions when the a predetermined manual operation is detected.

6. The image forming apparatus according to claim 2, wherein
the dividing condition accepting unit accepts a dividing condition for dividing the touch panel into plural regions in a manner such that the regions include substantially a same number of the buttons.

7. The image forming apparatus according to claim 2, wherein
when the image forming apparatus provides plural functions using respective screens, the dividing condition accepting unit accepts the dividing condition for the corresponding functions.

8. The image forming apparatus according to claim 2, wherein
the moving region display unit refers to device mounting information and user use restriction information, the device mounting information storing button information of an optional part that is mounted on the image forming apparatus, the user use restriction information storing information regarding one or more of the buttons that can or cannot be used by a user, and then,
the moving region display unit does not stop the region mark on a region where all the buttons consist of only buttons corresponding to a not-mounted device based on the device mounting information or only buttons that cannot be used based on the user use restriction information or consisting of a combination thereof.

9. The image forming apparatus according to claim 1, wherein
the moving region display unit displays the region mark on the touch panel in a manner such that the region mark displaying button information of the buttons moves in a uniform direction, and
the button specifying unit specifies one of the buttons corresponding to the button information displayed in the region mark, the one of the buttons existing in a position in accordance with the positional information indicating the pressed position.

10. The image forming apparatus according to claim 9, further comprising:
a use frequency recording unit configured to record use frequency of the one of the buttons specified by the button specifying unit, wherein
the moving region display unit changes a size of the region mark depending on the use frequency.

11. The image forming apparatus according to claim 9, further comprising:
a use frequency recording unit configured to record use frequency of the one of the buttons specified by the button specifying unit, wherein
the moving region display unit changes moving speed of the region mark depending on the use frequency.

12. The image forming apparatus according to claim 9, further comprising:
a use frequency recording unit configured to record use frequency of the one of the buttons specified by the button specifying unit, wherein
the moving region display unit changes color of the region mark depending on the use frequency.

13. The image forming apparatus according to claim 9, wherein
the moving region display unit displays a number along with the button information on the region mark, and
the button specifying unit specifies a button displaying a same number in the region mark as that pressed by ten keys mounted by hardware.

14. The image forming apparatus according to claim 9, further comprising:
a user identification unit configured to identify a user of the image forming apparatus;
a disabled information storage unit configured to store information whether the user is disabled; and
a switching unit configured to, when the user is determined to be disabled, switch from a mode of accepting a pressing operation of static buttons to a mode of accepting an operation where the region mark moves.

15. An operation accepting method used in an image forming apparatus accepting a selecting operation of selecting a button displayed on a touch panel thereof and performing a process corresponding to the selected button, the operation accepting method comprising:
a moving region display step of moving a region mark to be selected on the touch panel as time passes; and
a button specifying step of specifying one or more of the buttons based on positional information indicating a position of the region mark and positional information indicating a pressed position of the touch panel.

* * * * *